United States Patent
Robinson

(10) Patent No.: US 7,558,479 B1
(45) Date of Patent: Jul. 7, 2009

(54) ANALYSIS AND CONTROL OF OPTICAL COMMUNICATIONS SYSTEMS

(75) Inventor: Alan Robinson, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 604 days.

(21) Appl. No.: 10/825,542

(22) Filed: Apr. 15, 2004

(51) Int. Cl.
*H04B 10/08* (2006.01)
*H04B 10/00* (2006.01)

(52) U.S. Cl. ............... 398/28; 398/9; 398/13; 398/16; 398/25; 398/33; 398/158

(58) Field of Classification Search ........... 398/9, 398/13, 16, 20, 23–28, 31, 33, 141, 147, 398/158–160, 192, 193, 184, 208
See application file for complete search history.

(56) References Cited
U.S. PATENT DOCUMENTS

| | | | |
|---|---|---|---|
| 6,538,788 B2 * | 3/2003 | Franco et al. | 398/158 |
| 6,718,138 B1 * | 4/2004 | Sugawara | 398/9 |
| 6,836,620 B1 * | 12/2004 | Bischoff | 398/26 |
| 2004/0067064 A1 | 4/2004 | McNicol | |

* cited by examiner

*Primary Examiner*—Dalzid Singh
(74) *Attorney, Agent, or Firm*—Barnes & Thornburg LLP

(57) ABSTRACT

An optical communications system has a plurality of spans between a transmitter and a receiver. The receiver has optical to electrical conversion circuitry for converting the received optical signal to an electric signal, analogue to digital conversion circuitry and digital signal processing means for analysing the electrical digital signal. The digital signal processing means derives information concerning characteristics of individual spans from the electrical digital signal. This enables parameters such as per-span variations in provisioned power, local dispersion and span loss to be measured. In-service measurements of system characteristics can be used to enable optimisation of the network operation.

20 Claims, 17 Drawing Sheets

ANALYSIS AND CONTROL OF OPTICAL COMMUNICATIONS SYSTEMS

FIELD OF THE INVENTION

This invention relates to optical communications networks, and particularly to the monitoring of performance across such networks.

BACKGROUND OF THE INVENTION

Optical communications systems are arranged as nodes connected together by optical fiber connections. These connections are formed from multiple spans, with line amplifiers provided between the spans to enable the overall reach of the connection to be increased. In addition to amplification, other measures may be taken at the line amplifier sites, such as dispersion compensation.

The performance of optical transmission systems can be improved by adjusting line parameters at the line amplifier sites, such as signal power to optimise the balance between noise (dominant at low signal power) and non-linear crosstalk and distortion (dominant at high signal powers). In Edge or Metro networks, and in future cost reduced line systems, there may be little directly available information on the provisioned signal power at each amplifier node. There is therefore a need to derive information concerning the characteristics of each span from signals received at the receiving node.

Single channel measurements are desirable for in-service feedback, because in a mesh network, the transmitters and receivers of co-propagating signals may not be co-located, so there may not be access to the data in these channels. Unfortunately, single channel measurements are limited in the extent to which non-linear distortions from different parts of the line can be separately, i.e. spatially, resolved.

Simulations of envelope distortion (assuming that no phase information is available) show that an estimate of average non-linear distortion is possible. However, similar distortions are generated by a small change in the mean provisioned power and by a linear tilt in per-span power along the line. Thus, it is difficult to distinguish between different optical effects using analysis of received signal amplitudes.

More reliable estimates may be possible when phase information is available, for example from a digital coherent receiver, or from a demodulator for differential phase shift keyed (DPSK) signals, but the resolution will be limited by the extent to which chromatic dispersion causes changes in the signal envelope within each span. This is required for identifiably different contributions from different locations along the line.

Various measurements have been proposed for system monitoring, in order to enable system performance to be improved. These include single channel measurements, both at installation and in-service. Multiple channel measurements are also possible at installation and in service, for example cross phase modulation and also four wave mixing measurements.

In-service measurements are desirable because a number of parameters will change over time over the life of the system, and in-service measurement of these will allow performance to be optimised. Examples are provisioned power in each channel, power in each fibre segment, the adding or re-routing of channels, amplifier operating conditions, non-linear distortion (SPM) and non-linear crosstalk (XPM, FWM).

Ideally, in-service estimation should depend only on the performance of the target channel under consideration. Access to the waveforms or bit sequences propagated in neighbouring co-propagating channels may involve additional hardware, software, or management costs, but can enable greater selectivity than purely single channel measurements. In general, it is not desirable to rely on the presence of co-propagating channels, and in a network with optical add-drop capabilities, there is no guarantee that co-propagating channels share the same endpoints. If the variations of fibre dispersion and signal power within the transmission line are known, the magnitude of WDM impairments can be estimated. When information on the waveform and/or data modulation carried by co-propagating waveforms is present, a more detailed and accurate estimation of performance is possible.

There remains a difficulty in obtaining in-service measurements which enable significant improvements in system operation to be obtained.

SUMMARY OF THE INVENTION

This invention relates to the extraction of line parameters, by analysing the non-linear distortion and crosstalk using digital signal processing capabilities at the transmitter and receiver.

According to a first aspect of the invention, there is provided an optical communications system, comprising:
  a transmitter;
  a receiver;
  an optical communications link between the transmitter and receiver comprising a plurality of spans; and
  at least one line amplifier between spans of the communications link,
  wherein the receiver comprises:
    optical to electrical conversion circuitry for converting the received optical signal to an electric signal;
    analogue to digital conversion circuitry; and
    digital signal processing means for analysing the electrical digital signal, wherein the digital signal processing means derives information concerning characteristics of individual spans from the electrical digital signal.

The system of the invention enables parameters such as per-span variations in provisioned power, local dispersion and span loss to be measured. In-service measurements of system characteristics can be used to enable optimisation of the network operation.

The invention uses the interaction between fibre chromatic dispersion and Kerr effect non-linearity to spatially resolve non-linear distortion from different parts of the transmission line. Chromatic dispersion alone is a linear process, and in the absence of non-linearity the received waveform is insensitive to the longitudinal distribution of dispersion, and to how the signal power varies along the line.

The invention preferably is implemented in a system with no in-line dispersion compensation, as such compensation would make it difficult to spatially separate non-linear distortion and crosstalk. In particular, there is then no longer a monotonic relationship between propagation distance and accumulated dispersion.

More detailed information on the spatial distribution of parameters can be extracted when two or more co-propagating transmitters are available. A cross-phase modulation (XPM) scheme offers scope for spatially resolved estimates of local dispersion coefficient, and other line parameters. In its simplest forms, this requires control of signal waveforms at the transmitters, so is particularly suitable for measurements at installation. This is especially useful for dispersion coefficient estimates, or measurements of net dispersion per span, as the dispersion distribution is unlikely to vary significantly over the life of the link.

It is possible to extract similar XPM information from in-service signals. One option for XPM crosstalk is to cross-correlate the estimated phase crosstalk at the receiver with the power envelope of the interfering signal waveform. Simulations of XPM crosstalk between DBPSK modulated signals shows that this is feasible at optical signal to noise ratios down to 20 dB or lower. With sufficient averaging, recognizable phase signatures can be extracted for signal to noise ratios as low as 5 dB, close to the usable limit for DBPSK modulation with strong forward error correction at the receiver.

The invention uses the increasingly powerful signal processing capabilities in the electronics of both transmitter and receiver modules, in order to estimate line properties or to evaluate signal degradation, reducing requirements for direct optical measurements.

A direct measure of line performance is already available, for example from the bit error rate before forward error correction (FEC). The invention enables non-linear distortion or crosstalk to be used to provide additional information, such as identifying which spans are provisioned with higher or lower than optimum power. In particular, the interaction between Kerr effect non-linearity and chromatic dispersion is used for spatially resolved information to be extracted about line parameters.

In order to optimise performance, a number of factors can be taken into account, such as power and attenuation, provisioned power per channel per span, span loss, local attenuation, chromatic dispersion, net line dispersion, dispersion per span, dispersion close to line amplifier (which determines WDM non-linearity). There are also polarisation issues and various non-linear effects, such as XPM, FWM.

The different monitoring techniques provided by the invention enable many such parameters to be identified based on analysis of signals received at the receiver and with minimal or no intermediate monitoring.

As mentioned above, the invention can be used to analyse a self phase modulation effect at installation or in-service, and/or a cross phase modulation effect at installation or in-service, and/or a four wave mixing effect.

For in-service monitoring of a cross phase modulation (XPM) effect, the means for analysing the digital signal preferably comprises means for correlating a cross talk signal based on a received signal with an interfering signal to derive a correlation signal. This interfering signal may comprise a data signal transmitted over a different channel to the analysed signal. The correlation signal is preferably filtered to remove a symbol rate component.

According to a second aspect of the invention, there is provided an optical communications system, comprising:
  a transmitter;
  a receiver; and
  an optical communications link between the transmitter and receiver comprising a plurality of spans,
  wherein the transmitter comprises means for modulating an optical signal for transmission using single side band modulation, wherein the modulating means is controllable to use upper side band modulation or lower side band modulation at different times as desired, and wherein the receiver comprises means for determining the differential delay between upper and lower side band modulations, thereby to determine the dispersion of the optical communications link.

This system uses the frequency offset between side band modulation tones in order to enable dispersion to be measured. The receiver then preferably determines the differential delay by cross correlating the received signal with the upper side band signal envelope and with the lower side band signal envelope.

According to a third aspect of the invention, there is provided a transmitter for use in an optical communications system, comprising:
  means for modulating an optical signal for transmission using single side band modulation, wherein the modulating means is controllable to use upper side band modulation or lower side band modulation at different times as desired.

According to a fourth aspect of the invention, there is provided a receiver for use in an optical communications system for receiving an optical signal from an optical link comprising a plurality of spans, the receiver comprising:
  optical to electrical conversion circuitry for converting a received optical signal to an electric signal;
  analogue to digital conversion circuitry; and
  digital signal processing means for analysing the electrical digital signal, wherein the digital signal processing means derives information concerning characteristics of individual spans from the electrical digital signal.

According to a fifth aspect of the invention, there is provided a method of monitoring characteristics of an optical link in an optical communications system between a transmitter and a receiver, the method comprising:
  receiving a signal from the transmitter at the receiver;
  converting the received optical signal to an electric signal;
  performing analogue to digital conversion; and
  analysing the electrical digital signal to derive information concerning characteristics of individual spans from the electrical digital signal.

According to a sixth aspect of the invention, there is provided a method of operating an optical communications system comprising a transmitter, a receiver and an optical communications link between the transmitter and receiver comprising a plurality of spans, the method comprising:
  at the transmitter, modulating an optical signal for transmission using single side band modulation, using upper side band modulation and lower side band modulation at different times;
  at the receiver, determining the differential delay between upper and lower side band modulations, thereby to determine the dispersion of the optical communications link.

BRIEF DESCRIPTION OF THE DRAWINGS

Examples of the invention will now be described in detail with reference to the accompanying drawings, in which:

FIGS. 7-19 show how the in-phase component of FIG. 16 varies under different conditions;

It will be noted that throughout the appended drawings, like features are identified by like reference numerals.

DETAILED DESCRIPTION OF THE PREFERRED EMBODIMENT

Figure 1A:
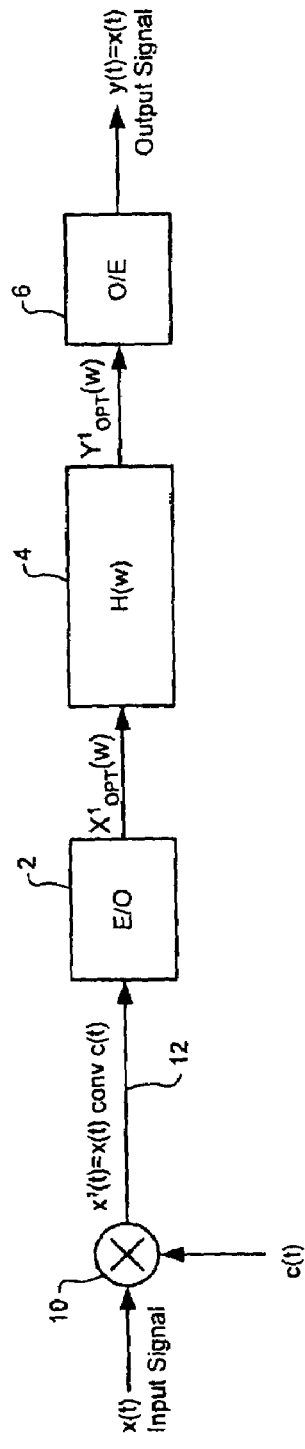
FIGS. 1a and 1b are block diagrams schematically illustrating transmission of an input data signal through an optical communications system in accordance with the present invention.

The Assignee has proposed (but not yet published) a system which enables the characteristics of an optical signal to be varied by digital processing of the original electrical signal, in the electrical domain, and also enables analysis of optical signal characteristics electrically. This ability to pre-process or post-process an optical signal in the electrical domain has been proposed in order to enable compensation of optical distortions, most notably chromatic dispersion.

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach. Optical signals are progressively attenuated as they propagate through a span, and amplified by an optical amplifier (e.g., an Erbium Doped Fiber Amplifier—EDFA) prior to being launched into the next span. However, signal degradation due to noise and dispersion effects increases as the signal propagates through the fiber. Consequently, noise and dispersion degradation become significant limiting factors of the maximum possible signal reach.

Mathematically, first order dispersion is the derivative of the (temporal) group delay of the optical path with respect to wavelength. The fibre dispersion coefficient is measured in picoseconds arrival time change per nanometre change in wavelength per kilometre length (ps $nm^{-1}$ $km^{-1}$). The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibers presents serious problems when using light sources whose spectrum is non-ideal, for example broad or multispectral-line, or when high data rates are required, e.g., over 2 GB/s.

One commonly used method of addressing the problem of dispersion in high-bandwidth communications systems is by inserting one or more optical dispersion compensators within a link. Such dispersion compensators may, for example, take the form of length of fiber, a Mach-Zehnder interferometer, an optical resonator, or a Bragg reflector. Some of these compensators can also produce a controllable amount of compensation, which enables mitigation of time-variant dispersion effects. In either case, these compensators are intended to at least partially offset the signal distortions introduced by the system transfer function. The compensation function is a dispersive function that is selected to optimize performance of the link.

In a fully linear system, the compensation function would preferably be equivalent to the complex conjugate of the optical link transfer function, so that the combined effect would be an undistorted received signal that exactly corresponds to the original optical signal. However, limitations of optical components, and the time-varying amount of compensation required, make this objective very difficult to achieve. Additionally, optical compensators are expensive and introduce significant optical losses. These losses must be offset by means of additional optical gain which introduces more optical noise. The additional (or higher-performance) optical amplifiers required to provide this increased gain further increase the total cost of the communications system. In addition, the presence of optical dispersion compensators and high performance amplifiers distributed along the length of the link provides a significant technical barrier to system evolution. For example, implementation of optical switching (e.g. at the transmitter and/or receiver ends of the link, or an intermediate site without electrical termination) necessarily requires adjustment of optical amplifiers, in order to accommodate changing energy states within the link.

These problems can be alleviated by moving the compensation function to the terminal ends of the link. This technique typically involves "preprocessing" the input signal at the transmitter end of the link to improve dispersion tolerance, and/or processing the output signal detected at the receiver end of the link to accurately detect the input signal within the distorted output signal.

For example, high bandwidth traffic can be distributed over a larger number of lower-rate channels. The reduced bit-rate of each channel enhances the dispersion tolerance in proportion to the square of the reduction in the bit-rate. However, this approach is expensive, spectrally inefficient, and creates four wave mixing problems.

It is known that the use of a coherent receiver enables the signal degradation due to dispersion to be removed via linear electrical filtering. However, because of their high cost, very few coherent optical receivers have been installed, and the cost of replacing installed receivers with the high-performance coherent receivers has been prohibitive.

The majority of receivers installed in modem optical communications networks are of the direct detection type. Due to the well known squaring effect in these receivers, electrical processing of the output signal is capable of compensating only a very limited amount of dispersion.

The alternative system proposed by the Assignee is for compensating optical dispersion and other optical degradation of a communications signal conveyed through an optical communications system. A compensation function is determined that substantially mitigates the chromatic dispersion imparted to the communications signal by the optical communications system. The communications signal is then modulated in the electrical domain using the compensation function.

This approach takes advantage of high speed digital electronic circuitry now available which can operate at speeds sufficient to control the modulation of an optical carrier at rates higher than the optical bit rate, in order to implement pre- or post-compensation. The method can be implemented at either the transmitter or receiver ends of the communications system, or may be divided between both ends, as desired.

When the method is implemented in the transmitter, predistortion is applied using digital filtering based on a compensation function to generate the predistorted signal from the original electrical input signal. The predistorted signal is then used to modulate an optical source to generate a corresponding predistorted optical signal for transmission through the optical communications system. The predistorted signal can then incorporate compensation for dispersion and component non-linearities throughout the system. Consequently, dispersion compensation can be effectively implemented independently of the type of detection (i.e. direct or coherent) used in the receiver.

When the method is implemented in the receiver, the received optical signal is converted into a corresponding received electrical signal, which includes distortions due to dispersion imparted on the optical signal by the optical communications system. The received electrical signal is then sampled (e.g. using an analogue-to-digital converter) and digitally filtered using the compensation function to generate an output electrical signal which is a substantially undistorted version of the original communications signal.

The system proposed by the Assignee for providing digital electrical processing for compensation of optical effects will first be described. This invention uses the capability provided by the proposed system in order to provide analysis of the characteristics of the received signals in order to derive information concerning the characteristics of the optical spans in the optical link.

Figure 1B:
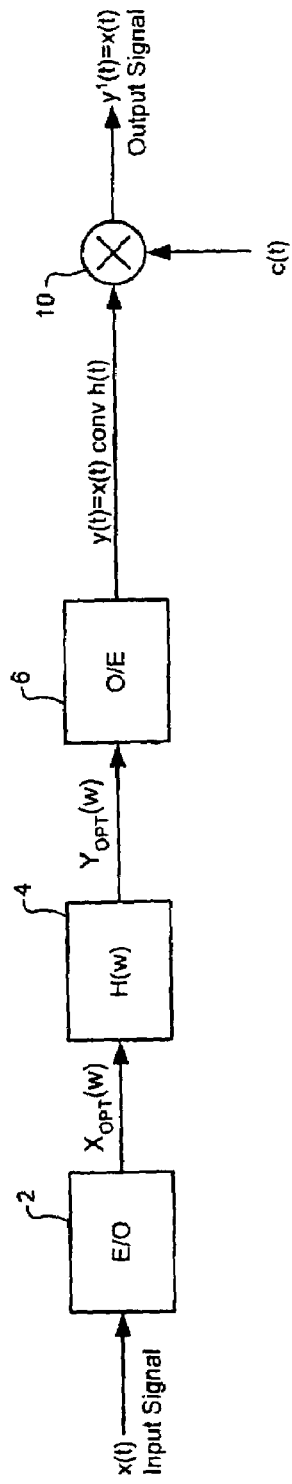

FIGS. 1a and 1b are block diagrams schematically illustrating principal operations of the proposed system for providing chromatic dispersion compensation. FIG. 1a shows an embodiment in which dispersion compensation is implemented at the transmitting end of the communications system. Conversely, FIG. 1b illustrates an embodiment in which dispersion compensation is implemented at the receiving end of the communications system.

Figure 2:
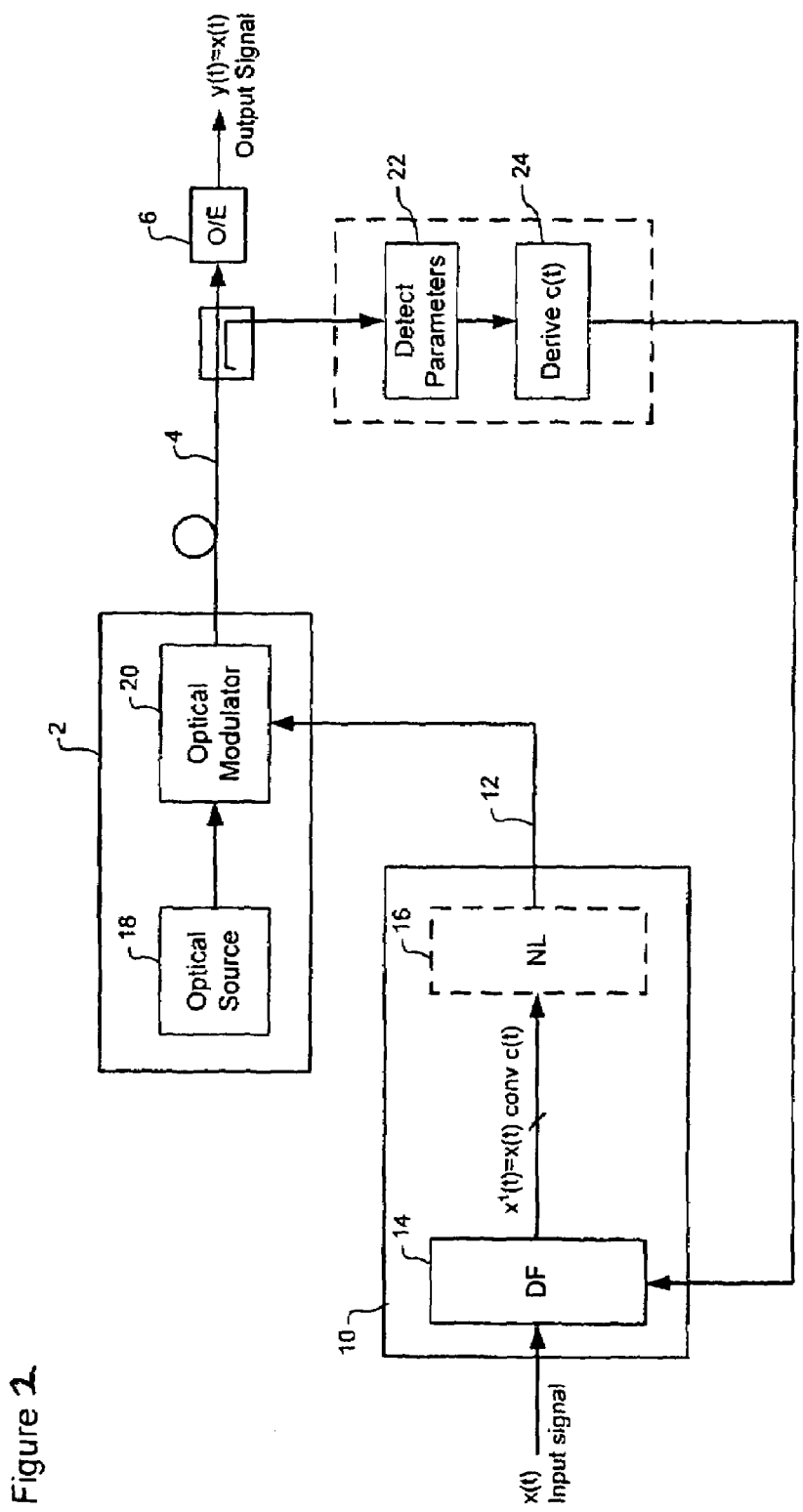
FIG. 2 is a block diagram schematically illustrating principal components and operations of a compensation modulator used in the system of FIG. 1.

As shown in FIG. 1a, the optical communications system is represented by electrical-to-optical (E/O) and optical-to-electrical (O/E) converters 2 and 6 separated by an optical link 4 represented by a system transfer function H(w). In order to simplify the present description, the E/O and O/E converter blocks 2 and 6 shown in FIG. 2 are considered to be ideal, in the sense that they do not introduce any signal distortions that are not otherwise accounted for by the system transfer function H(w). Signal distortions introduced by the system transfer function are compensated by deriving a compensation function c(t) that optimizes system performance. For chromatic dispersion, for example, the compensation function c(t) will be equivalent to the complex conjugate H*(w) of the system transfer function H(w).

In non-linear systems, the compensation function c(t) will be non-linear, but in all cases, the compensation function is selected to optimize system performance. A compensation filter 10 uses the compensation function c(t) to filter the input signal x(t) in the electrical domain, thereby producing a predistorted input signal $x^1(t)$ 12 given by:

$$x^1(t) = x(t) \text{conv } c(t) \quad (1)$$

where "conv" is the convolution (compensation) function.

The predistorted input signal $x^1(t)$ 12 is then converted to a corresponding predistorted optical signal $X^1_{OPT}(W)$ by the E/O converter 2 and transmitted through the optical link 4 to the receiver. Within the receiver, the incoming optical signal $Y^1_{OPT}(w)$ is converted by the O/E converter 6 into a corresponding output signal y(t). As may be seen in FIG. 1, the received optical signal $Y^1_{OPT}(w)$ is the predistorted optical signal $X^1_{OPT}(w)$ multiplied by the transfer function H(w) of the optical communications system. Because the distortions introduced by the compensation function c(t) exactly counterbalance those introduced by the system transfer function H(w), the output signal y(t) generated by the O/E converter will be a substantially undistorted version of the original input data signal x(t). Thus, a technique of compensating optical distortions impressed upon optical signals traversing the optical link 4 is provided, by predistorting the input data signal x(t) within the electrical domain at the transmitting end of the optical link 4. Because distortion compensation is accomplished in the electrical domain, a substantially arbitrary compensation function c(t) can be implemented, thereby facilitating effective compensation of even severe optical dispersion.

FIG. 2 is a block diagram schematically illustrating principal elements and operations of a first example of compensation modulator 10. As shown in FIG. 2, the input signal x(t) is filtered by a digital filter 14 which accepts the compensation function c(t) as an input. Various known digital filter types may be used to implement the digital filter 14, such as, for example, Finite Impulse Response (FIR) filters, Infinite Impulse Response (IIR) filters, and Fast Fourier Transform (FFT filters). Alternatively, the digital filter 14 may be implemented using a Random Access Memory Look-up Table (RAM LUT), as will be described in greater detail below. In either case, the digital filter 14 generates the predistorted signal $x^1(t)$ 12, which compensates chromatic dispersion due to the system transfer function H(w).

The predistorted signal $x^1(t)$ 12 can then be converted into the corresponding predistorted optical signal $X^1_{OPT}(W)$ by means of a conventional electrical to optical converter 2. For example, in the illustrated embodiment, electrical to optical conversion is accomplished using a tuned optical source 18 such as a narrow band laser coupled to a conventional optical modulator 20. In this case, the predistorted signal 12 can be used as an input to control the optical modulator 20 in a manner known in the art.

Various methods may be used to derive the compensation function c(t). In the example of FIG. 2, the optical signal $Y^1_{OPT}(W)$ at or near the receiver end of the optical link 4 is monitored (at 22) in order to detect signal quality parameters indicative of dispersion in the optical communications system. In preferred embodiments, the signal quality parameters comprise a direct measurement of dispersion as a function of wavelength across the wavelength band of interest. However, other signal quality parameters such as, for example, the bit error rate or eye closure may be used a proxies for the dispersion. Any of the signal quality parameters may be detected based on an optical signal obtained by tapping the optical link 4 as shown in FIG. 2, or alternatively by analysis of the output signal y(t) generated by the E/O converter 6. A compensation function c(t) which optimizes the detected parameters can then be derived (at 24) deterministically and/or adaptively, using known techniques.

The functional step of deriving the compensation function c(t) can be implemented by any suitable combination of hardware and software, which may be co-located with the receiver, the transmitter, or any other location. In embodiments in which the detected parameters comprise direct measurement of dispersion, the compensation function c(t) can be calculated to minimize (and preferably eliminate) the total dispersion. Where bit error rate and/or eye closure are used as proxies, then the compensation function c(t) would be calculated to optimize these respective values.

The optical modulator 20 can be assumed to be fully linear, so that the modulator 20 does not introduce any further distortions beyond those accounted for by the system transfer function H(w). Depending on how the system transfer function H(w) is defined, this approach may yield satisfactory results. However, in many cases it may be desirable to treat the transfer function of the optical fiber span 4 separately from that of the optical modulator 20 and the optical-to-electrical converter 6 in the receiver. In this case, the compensation function c(t) calculated above will not account for distortions introduced by the optical modulator 20 or the optical-to-electrical converter 6. However, the performance of these components is typically well characterized. It is therefore possible to implement a non-linear compensator 16 in order to further distort the predistorted signal 12 in such a manner as to fully compensate non-linearities of the optical modulator 20 and/or the O/E converter 6, as desired. The non-linear compensator 16 can be implemented as a non-linear digital filter, such as an LUT or non-linear multiplier.

The system may also be used to compensate for other non-linear effects. Of particular concern in considering non-linear processes are the effects of phase nonlinearities, which increase as data rates and optical power levels increase, and which ultimately limit both system performance and signal reach.

Phase nonlinearities are the result of complex interactions between the optical power present in the fiber, the refractive index of the fiber medium, the wavelength-division-multiplexing (WDM) channel spacing, the polarization states of the signals within each of the channels, and the proximity of channel wavelengths to the zero-dispersion wavelength of the fiber. Phase nonlinearities include self-phase modulation (SPM), cross-phase modulation (XPM), and modulation-instability (MI).

Various methods may be used to determine a compensation function which also compensates for these effects. By monitoring the signal at or near the receiver, signal quality parameters can be obtained indicative of non-linear and cross-channel effects of the optical link 4. For example, direct measurements of SPM, XPM, MI, four-wave mixing and cross-talk across the wavelength band of interest can be taken. Methods of estimating SPM, XPM and FWM contributions have been proposed, but resolution and accuracy may be poor at the relatively low signal to noise ratios now practicable with the use of forward error correction (FEC). When strong FEC is used, an alternative measure of performance is the bit error rate (BER) of the detected signal before error correction is applied at the receiver.

For example, XPM between a pair of channels can be estimated by launching a modulated signal through a first channel, while a data signal is simultaneously transmitted through a second channel. As the two signals co-propagate through the link 4, XPM between the channels generates timing jitter in the data signal which is received, by the receiving node 4b, through one of the channels. Correlation between the first modulated signal and the phase error signal of the recovered data clock from the received second channel, enables computation of an XPM transfer function, which models some aspects of XPM-induced signal distortion impressed on signal traffic traversing the link.

In many cases, SPM can be described as a function of XPM, because the mechanisms involved in producing both XPM and SPM are related. Consequently, for any particular optical communications system, a look-up table can be defined for estimating SPM from the detected XPM. The data used to populate the look-up table may, for example, be based on experimental data obtained during the set-up and commissioning of the optical communications system. If desired, the look-up table data may be updated, e.g., using fresh experimental data obtained during maintenance of the optical communications system to accommodate migration of the optical component performance.

Alternatively, a data signal arriving at the receiving node can be monitored to detect variations in signal noise with dispersion. This provides a direct indication of total XPM- and SPM-induced signal distortions, but does not enable these effects to be separated.

Figure 3:
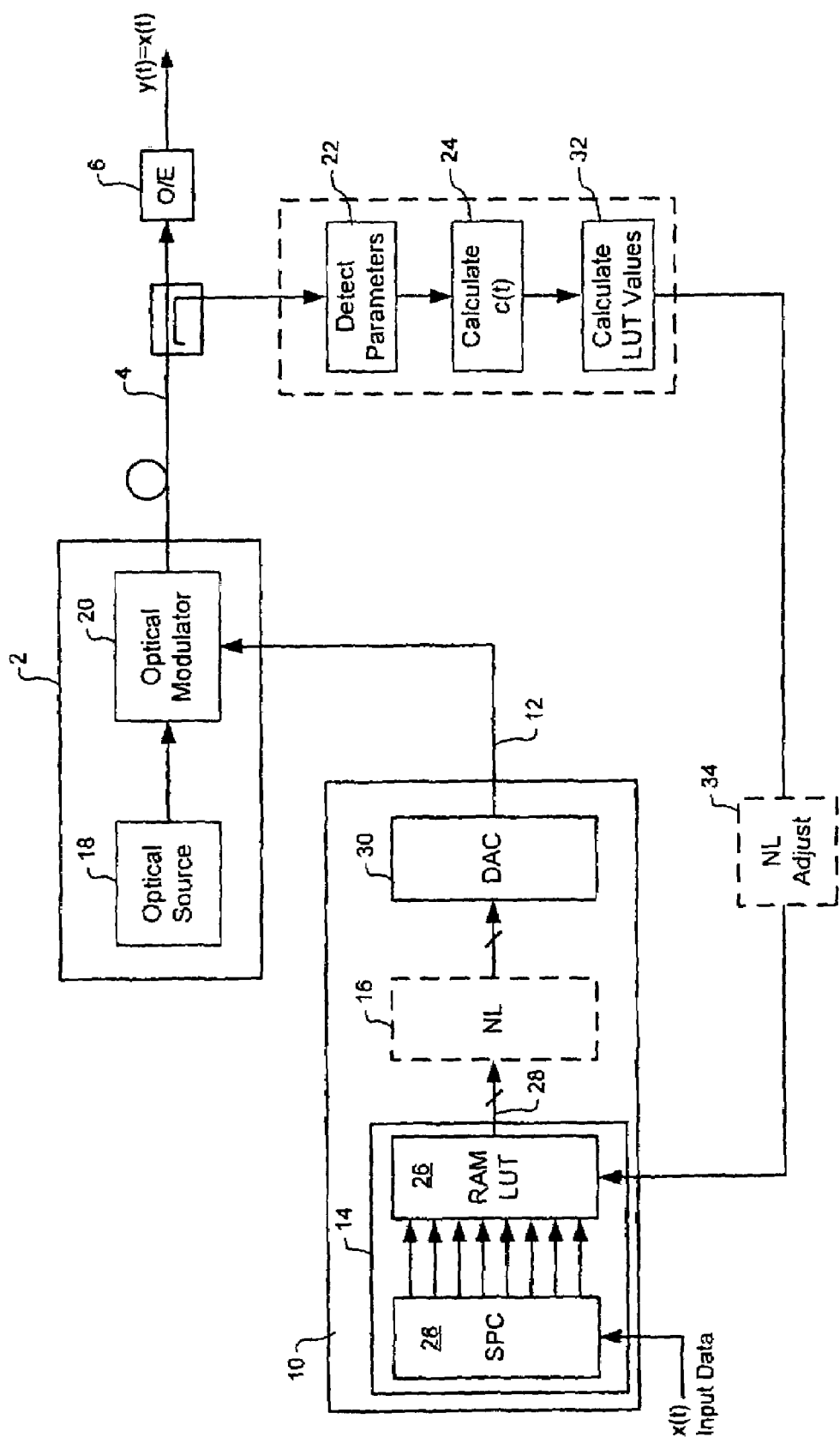
FIG. 3 is a block diagram schematically illustrating principal components and operations of an alternative compensation modulator used in the system of FIG. 1.

As mentioned above, the digital filter 14 may be implemented in a variety of ways. FIG. 3 schematically illustrates an embodiment in which the digital filter 14 is implemented using a RAM LUT 26. This technique exploits the fact that the input signal x(t) is a substantially undistorted binary signal, in which successive bits can be unambiguously discriminated. This greatly simplifies the problem of digitally filtering the input signal x(t), because a direct relationship can be defined between the input signal x(t) and the predistorted signal $x^1(t)$ 12.

As shown in FIG. 3, successive bits of the input signal x(t) are latched through a serial-to-parallel converter 28 (e.g., a shift register) which converts the serial bit stream into a parallel bit stream having a width of N bits. In the illustrated embodiment N=8, it being understood that other values of N may be used as desired. The parallel data stream is then used to access a random access memory (RAM) look-up table 26 having $2^N$ registers (not shown).

Because the RAM LUT 26 performs a substantially linear filtering function, it is possible to construct the LUT 26 as a set of two or more Random Access Memory blocks (not shown), if desired. In this case, each RAM block stores a respective portion of the desired numerical valve 28 of the predistorted signal component. Thus the outputs generated from each RAM block can be summed, in a conventional manner, to produce the desired numerical value 28. This arrangement allows the LUT 26 to be larger than can conveniently be accommodated within a single RAM block.

Each register of the look-up table 16 contains at least one digital number representing the analogue value of the predistorted signal $x^1(t)$ 12, which has been previously calculated for a unique set of N bits. Accordingly, as the input serial bit stream is latched through the serial-to-parallel converter 14, a stream of successive digital values 28 of the predistorted signal 12 are output from the look-up table 16. This stream of digital values 28 can then be converted into the corresponding analogue predistorted signal $x^1(t)$ 12 using a digital-to-analogue converter 30. The analogue predistorted signal $x^1(t)$ 12 can then be converted into the corresponding predistorted optical signal $X^1_{OPT}(w)$ by means of a conventional electrical to optical converter 2, as described above.

Various methods may be used to calculate each of the digital values stored in the look-up table 16. In the example of FIG. 3, the optical signal at or near the receiver end of the optical link 4 is monitored (at 22) to detect signal quality parameters and a compensation function c(t) which optimizes the detected parameters derived (at 28), as described above with respect to FIG. 2.

Because chromatic dispersion causes a time domain distortion of an input signal, the instantaneous value of the analogue predistorted input signal 12 at a particular instant (t) will necessarily be a function of the analogue waveform of the input data signal x(t) within a time window that brackets the instant in question. The width of the time window, measured in symbols, will generally be a function of the maximum dispersion $(D_M)$ for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum net dispersion $(D_M)$ that can be compensated is given by the equation:

$$D_M = N \cdot \frac{S}{B}, \quad (2)$$

where N is the width of the time window, measured in symbols. It will be appreciated that the selected value of N will limit the maximum dispersion $(D_M)$ that can be effectively compensated. In general, the value of N will be selected based on the expected maximum dispersion of the optical communications system.

In the example of FIG. 3, the look-up table uses N=8 successive bits of the input signal x(t) to reference successive values of the predistorted signal. In this case, the time window used for calculating each value of the predistorted signal spans a total of N=8 symbols, so that the total dispersion that can be compensated by the system of FIG. 2 will be given by:

$$D_M = 8 \cdot \frac{S}{B} \quad (3)$$

Following the discussion above, it will be seen that each value stored in the look-up table 16 can readily be calculated (at 32) by applying the calculated compensation function to each one of the $2^N$ possible N-bit sequences. For each N-bit sequence, the calculated look-up table value would then be stored in the RAM look-up table 16 register that is indexed by the N-bit sequence in question. This process will result in the look-up table 16 being loaded with pre-calculated values of the predistorted signal 12 which will be accessed, in sequence, as successive bits of the input data signal x(t) are latched through the serial-to-parallel converter 14.

In some instances, it may be advantageous to arrange the RAM LUT 26 to output more than one numerical value 18 of the predistorted signal 12 for each symbol of the input signal x(t). This can readily be accomplished by calculating the required numerical values 18 for each N-bit sequence, and storing the resulting set of numerical values in the appropriate register. Consequently, as each bit of the input signal x(t) is latched through the serial-to-parallel converter 28, all of the numerical values calculated for each unique N-bit sequence will be output, in an appropriate sequence, from the RAM LUT 26.

As may be seen in FIG. 3, the non-linear compensator 16 may be implemented as a second look-up table positioned between the dispersion compensation look-up table 26 and the digital-to-analogue converter 30. Alternatively, the look-up table values calculated (at 32) using the compensation function c(t) can be adjusted (at 34) based on the known non-linearities of the optical modulator 20 and/or optical-to-electrical converter 6. In this case, values 28 obtained by accessing the RAM look-up table 26 will combine compensation for both dispersion and nonlinearities.

In the embodiments of FIGS. 2 and 3, a single compensation modulator path is provided for generating the predistorted signal $x^1(t)$ 12 based on the input signal x(t). As will be appreciated, such an arrangement is suitable for modulating a single dimension (e.g., either amplitude or phase) of the input data stream x(t). Accordingly, the predistorted signal $x^1(t)$ 12 of the embodiments of FIGS. 2 and 3 will comprise an amplitude or phase modulated version of the original input data stream x(t). However, the system transfer function H(w) of the optical communications system will normally be complex, so that an optical signal traversing the communications system will suffer distortions in both phase and amplitude. This issue is addressed by the embodiment of FIG. 4.

Figure 4:
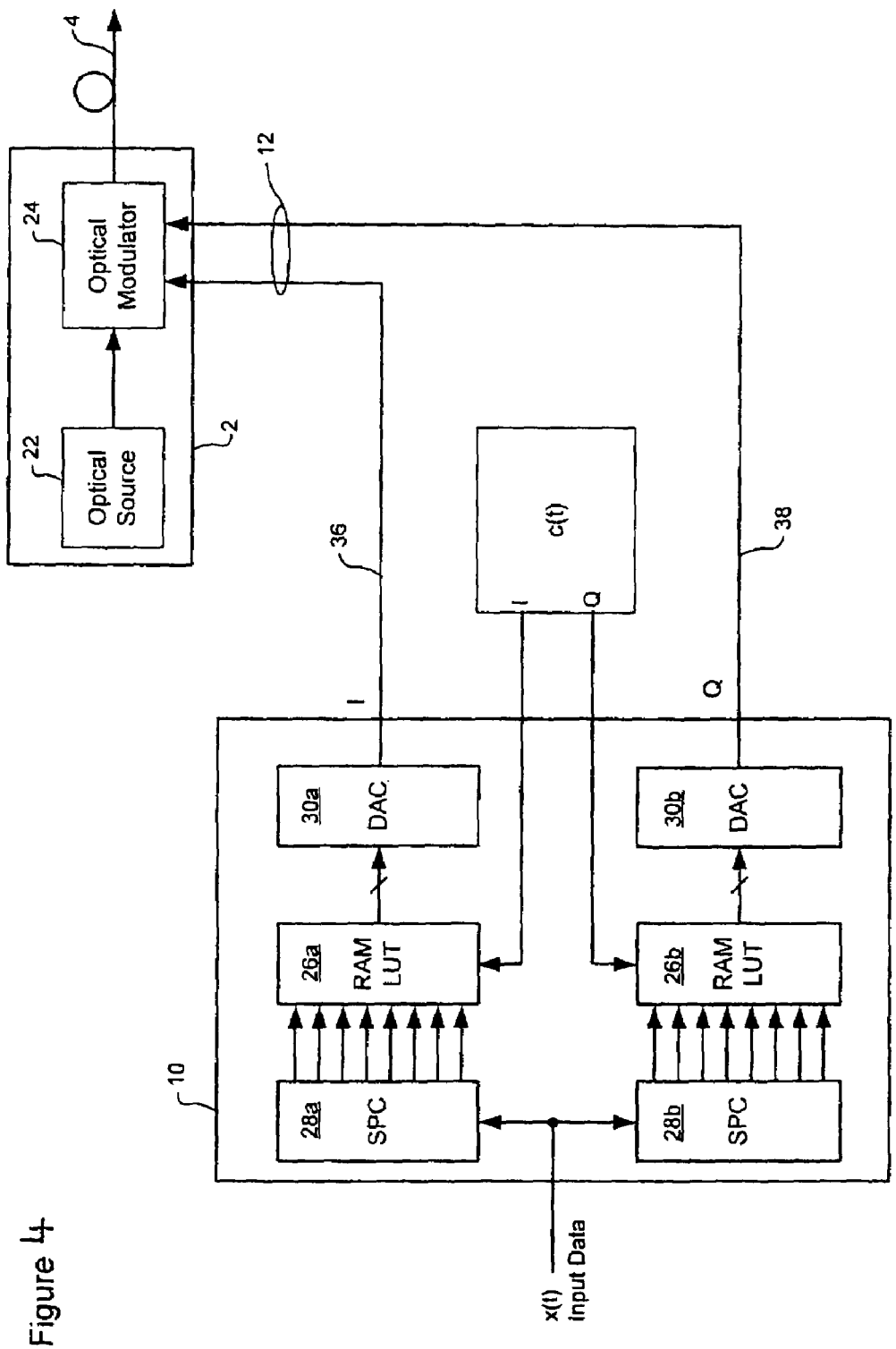
FIG. 4 is a block diagram schematically illustrating principal components and operations of a further alternative compensation modulator used in the system of FIG. 1.

FIG. 4 is a block diagram schematically illustrating an embodiment in which a multi-dimensional compensation modulator 10 is used to compensate complex system transfer function effects. In general, the multi-dimensional compensation modulator 10 provides an independent compensation path for each dimension of the communications system for which compensation is to be provided. In the embodiment of FIG. 4, it is desired to provide compensation for both amplitude and phase distortions, and therefore the multi-dimensional compensation modulator 10 comprises a pair of independent compensation paths. In this case, a pair of compensation paths generate respective output signals I and Q (at 36 and 38) that represent respective orthogonal (Cartesian) components of the predistorted signal 12. The two output signals I and Q are then supplied to a suitable multi-dimensional optical modulator 24 capable of modulating the amplitude and phase of light generated by the optical source 22 in response to the signal components I and Q of the predistorted signal 12. Various optical modulators capable of providing this functionality are known in the art, such as, for example, Mach Zehnder modulators.

As will be appreciated, the multi-dimensional compensation modulator 10 can be implemented using multiple compensation paths to generate the predistorted signal $x^1(t)$ 12 in any desired format, such as, for example, polar coordinates. The only limitation here is that a suitable optical modulator 24 must be provided for modulating the appropriate optical components in response to the signal components generated by the multi-dimensional compensation modulator 10.

Figure 5:
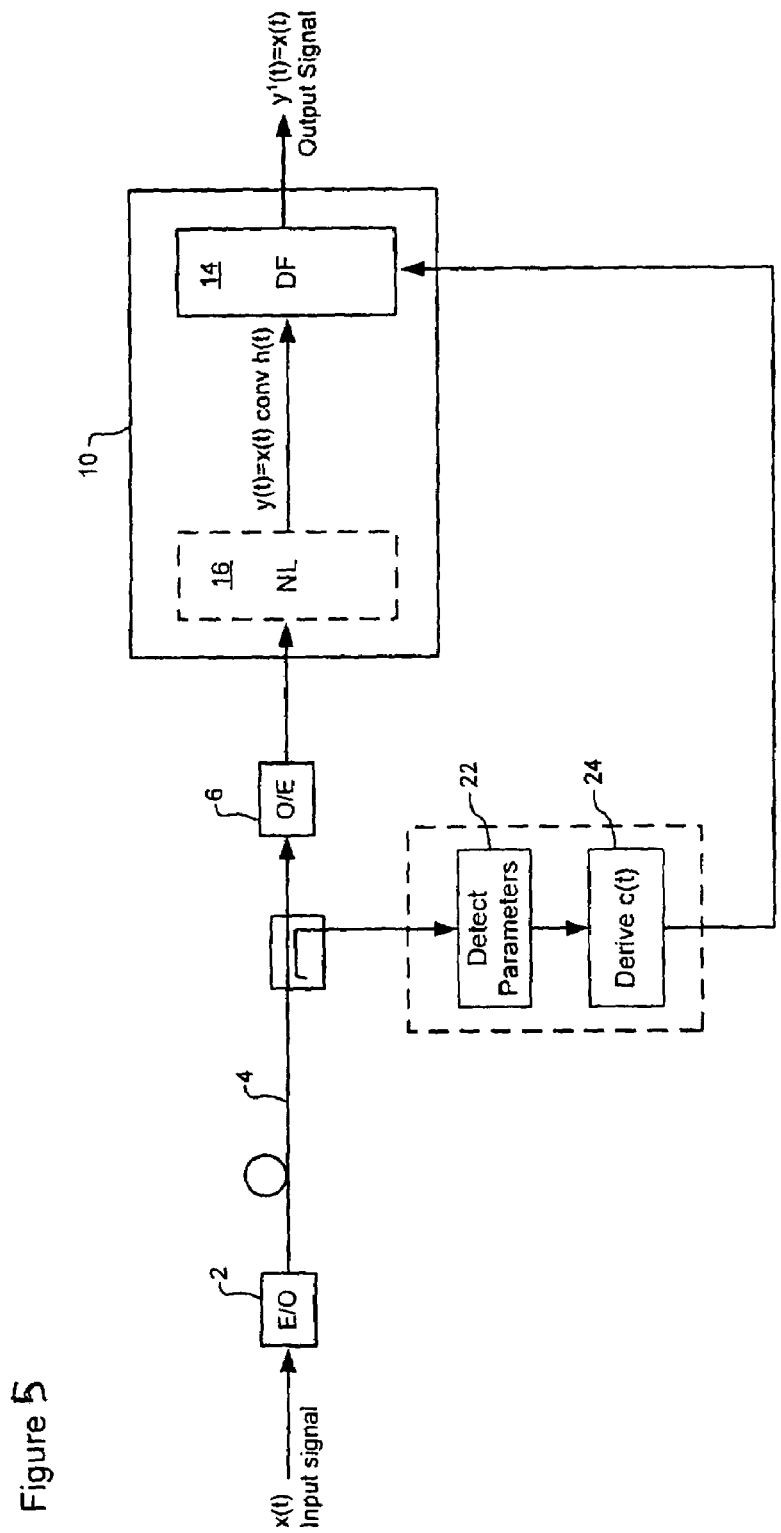
FIG. 5 is a block diagram schematically illustrating principal components and operations of a compensation modulator implemented at a receiving end of an optical communications system.

FIG. 5 shows the hardware required in the receiver when the compensation is to be carried out using the digital filtering at the receiver. Where components are used corresponding to those in FIG. 2, the same reference numerals are used and a detailed description is not repeated. The compensation module 10 is provided at the receiver but implements the same function as in the embodiment of FIG. 2.

The system described above provides the ability to compensate for optical degradation across a network by pre-processing the signal in the electrical domain before modulation onto an optical carrier, or post processing the signal in the electrical domain after demodulation.

This invention uses this capability of electrical processing at the receiver and at the transmitter in order to analyse the characteristics of the multiple line sections between the transmitter and receiver. When the compensation system outlined above is employed, there is no need for in-line dispersion compensation, and this means that the received signal has been distorted by each line section, and appropriate signal analysis can then enable the individual line section characteristics to be determined.

The invention uses the hardware described above, with additional digital signal processing capability in the receiver for performing the analyses described below. The invention can be used in combination with the chromatic dispersion compensation function described above, although the invention does not rely on the chromatic dispersion compensation and is independent of this capability of the system.

A number of different characteristics of the received signal can be used as a basis for analysis. As mentioned above, phase nonlinearities are the result of complex interactions between the optical power present in the fiber, the refractive index of the fiber medium, including the non-linear index coefficient, the wavelength division multiplexing (WDM) channel spacing, the polarization states of the signals within each of the channels and the proximity of channel wavelengths to the zero-dispersion wavelength of the fiber. Phase nonlinearities include self-phase modulation (SPM), cross-phase modulation (XPM), and modulation-instability (MI).

Self-phase modulation (SPM) is a by-product of the relationship between the refractive index of the fiber medium and the optical power present in the fiber. This is the Kerr effect. In particular, changing optical power causes a change in the refractive index of the fiber medium. The refractive index change is proportional to the optical power level. Changing the refractive index produces a Doppler-like frequency shift (or chirp) that is proportional to the time-rate of change of the refractive index (and, equivalently, the optical power level). Thus, changing optical power levels due to modulation of an optical signal causes a frequency-shift (or chirp) within the signal itself. For example, consider an isolated signal pulse (e.g., an isolated binary "1") launched into the optical fiber. SPM results in the leading edge of the pulse being red-shifted (that is, frequency shifted toward the red end of the optical spectrum), and the trailing edge of the pulse blue-shifted. Chromatic dispersion of the fiber will then cause these red- and blue-shifted portions of the pulse to propagate through the fiber at different speeds, which may result in time-domain distortion of the original pulse shape.

As may be appreciated, because the magnitude of the frequency shift is proportional to the time-rate of change of the optical power level, the amount of red- and blue-shift experienced by the pulse edges will be a function of the rise and fall times at the leading and trailing edges, and the peak power level of the pulse. In additional to these factors, the total time-domain distortion experienced by the pulse will also be affected by the nominal length of the pulse, and the length of the fiber before signal detection and regeneration. Clearly, the effects of SPM become increasingly severe as signal power, data rate (or spectral efficiency), and fiber span length are increased.

Cross-phase modulation (XPM) is similar to SPM, and produces the same frequency-shifting effects, but occurs in Wavelength Division Multiplexed (WDM) systems. XPM is always accompanied by SPM, and occurs because the effective refractive index "seen" by an optical wave propagating in the fiber medium depends not only on the intensity of that wave but also on the intensity of other co-propagating waves. Thus, refractive index changes due to rising and falling optical power levels in one channel induce corresponding frequency-domain distortions (chirps) within co-propagating signals (in adjacent channels). Chromatic dispersion of the fiber may then induce time-domain distortions of those signals, in the same manner as described above.

Different possible monitoring schemes are provided by the invention, depending on whether the system uses incoherent receivers, in which there is direct detection of signal power envelope, or coherent receivers in which amplitude and phase information is detected.

Ideally, a combination of spatially resolved and accumulated properties of the signal and the transmission link are desirable, in order to optimise the performance of the system. In principle the compensation applied at the transmitter and/or receiver can be adjusted by a 'blind' optimisation technique, in which filter transfer function parameters are adjusted to minimise an appropriate performance metric, such as raw bit error rate before forward error correction. In practice, this is difficult, particularly when a large number of parameters can be adjusted, including filter parameters and line amplifier gain or power settings. Some of the adjustments will be mathematically ill-conditioned: it may be difficult to distinguish the effects of raising power on span 5 and reducing power on span 7 from the effects of comparable changes to spans 6 and 8. Problems are compounded when changes to improve performance in one channel may degrade performance of a second co-propagating channel.

The present invention provides spatially-resolved information, such as independent measures of the power launched into each span, and of the XPM distortion introduced in different spans or from different channels. With this information, more robust control is possible. By comparing measured and predicted operating conditions, deviations from expected behaviour can be corrected, and allowance made for future changes such as the introduction of additional signal channels, or random changes in signal polarisation orientation through PMD. It is also possible to identify and correct fault conditions, such as a co-propagating wavelength introduced with too high or too low a signal power.

Parameters of value in provisioning signal powers and compensating for signal distortion and crosstalk include:

The net chromatic dispersion (the integrated product of dispersion coefficient and fibre length), which determines the total linear dispersion compensation required at transmitter and/or receiver.

The local dispersion in the sections of each span where non-linear distortion is high (usually close to each line amplifier output where the signal power is highest). In typical 10 Gbaud/s transmission systems, this influences the strength of WDM interactions, notably XPM and FWM.

The net dispersion within each span. This determines the temporal walk-off of XPM or FWM between adjacent spans, and influences how the WDM crosstalk accumulates in a multi-span link.

The signal power at the output of each line amplifier. This determines the strength of the non-linear interactions within each span, and hence the accumulated SPM distortion and WDM crosstalk.

The local fibre attenuation close to each line amplifier output. Together with the local dispersion and the channel separation, this determines the rate at which the magnitude of XPM phase crosstalk decays with distance within each span. It also influences the net SPM phase shift from each span.

The net attenuation in each span, and the noise figure of the following amplifier. These (and the signal launch power) determine the degradation of signal to noise ratio within the span.

Some of these parameters (such as fibre attenuation coefficient) vary little from fibre to fibre, although splice losses and cable degradation can increase the average attenuation coefficient. Others, such as fibre dispersion coefficient and net dispersion, vary by small amounts and only relatively slowly, and need not be monitored continuously. For others parameters, such as the signal power, or the resultant non-linear distortion, continuous monitoring is desirable.

A brief discussion of how the different non-linear effects can be used to obtain spatially resolved feedback information will now be presented.

Self-Phase Modulation

Self phase modulation can be used for single channel monitoring. If differences in provisioned power are to be resolved in different spans, sufficient changes in the signal envelope between spans are required to give a measurable difference to the waveform at the receiver. To estimate the rate at which a typical 10 Gbit/s waveform envelope changes, consider the half symbol rate (5 GHz) modulation sidebands which are the highest frequency components needed to describe a modulated signal with minimal excess bandwidth. For operation in the commonly used 1550 nm transmission band, 5 GHz corresponds to a 0.04 nm wavelength offset. Chromatic dispersion of 2500 ps/nm is sufficient for 100 ps (1 bit) phase slip, corresponding to phase reversal of the 5 GHz modulation sideband. For transmission over fibre with dispersion coefficient 5 ps/nm/km, such a substantial pulse distortion occurs only after propagation through 500 km fibre. In fibre with higher dispersion the distance is shorter, for example 156 km in standard fibre with dispersion 16 ps/nm/km. Changes in pulse shape within a single 80 km span are measurable, but much smaller. Consequently it is difficult to resolve per-span power variations solely from SPM phase distortion, especially in lower dispersion (dispersion-shifted) fibres.

Cross Phase Modulation

For cross-phase modulation in multi-span systems, the magnitude of the crosstalk is determined by the interfering signal power, the fibre non-linear coefficient, and three dispersion-related parameters:

Intra-span walk-off rate. The product of channel separation and local fibre dispersion near the output of each line amplifier. High dispersion causes rapid walk-off and reduces the peak magnitude of the induced phase modulation.

The net dispersion between the induced non-linearity and the receiver. This determines the extent of phase to amplitude conversion (and hence amplitude crosstalk in direct detection systems). In systems with high net dispersion it will also determine the magnitude and time dependence of the phase distortion present at the receiver.

Inter-span walk-off. The product of channel separation and net per-span dispersion as a proportion of the bit period. This determines the extent to which phase modulation induced in adjacent spans is correlated.

Four Wave Mixing

In typical 10 Gbit/s dense WDM transmission systems, fibre dispersion is at least 1 ps/nm/km, and channel separation 50 GHz or greater. The magnitude of induced FWM power oscillates rapidly with distance as a result of phase-mismatch between the contributing channels, which reduces the strength of the interaction. The phase mismatch increases with dispersion and channel separation. Under these conditions, FWM is dominated by near-neighbour interactions.

The use of SPM to provide a measure of fiber span characteristics will first be considered If an incoherent receiver is used, the receiver can determine only the power envelope. The sensitivity of this power envelope to inter-span power variations thus needs to be considered.

Analysis shows that SPM distortion does not give good results in resolving per span variations in launch power, although these per-span variations do provide different SPM characteristics. A less ambitious target is to detect more slowly varying changes.

Figure 6:
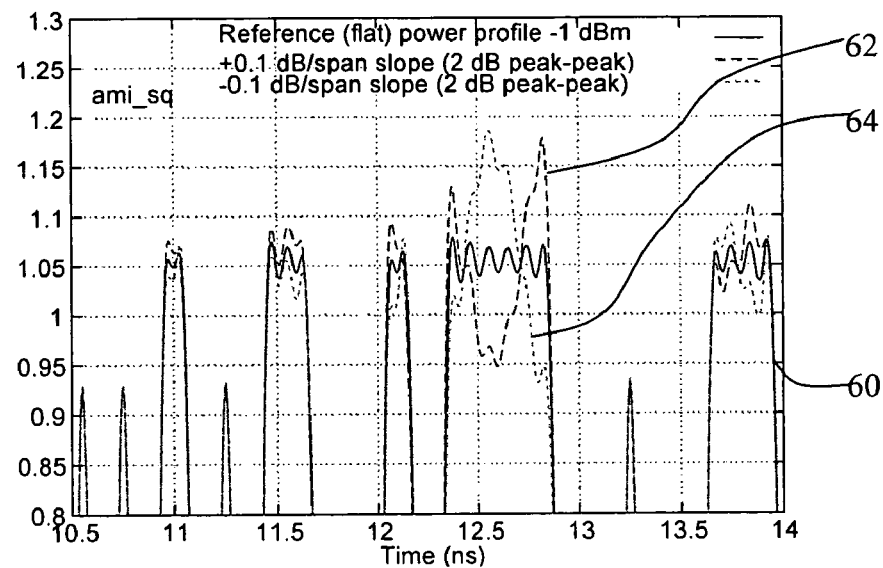
FIG. 6 shows how SPM affects a propagated signal.

FIG. 6 shows the received signal for a data sequence, when there is a steady 2 dB variation in gain along the transmission line, distributed as 0.1 dB per span over 20 spans. The solid line 60 shows the received signal with flat gain profile. Dotted line 62 shows the received signal for a positive dispersion slope, and dotted line 64 shows the received signal for a negative dispersion slope.

In summary, SPM distortion is sensitive to per-span power, chromatic dispersion distribution and PMD. However, there is a problem of separating the contributions from different spans. For example, it is extremely difficult to distinguish distortion from polarisation mode dispersion from per-span power variations. For this reason, the effects of the different spans on SPM do not provide the best tools for monitoring characteristics of different spans of the line.

XPM and FWM potentially offer improved spatially resolved dispersion measurements, based on the walk-off arising from group delays between channels resulting from chromatic dispersion. The differential delays are proportional to the frequency separation between channels, so the accuracy of such dispersion measurements will be limited by the accuracy and stability of the optical frequencies of those signals. To measure dispersion with an uncertainty of 250 ps/nm over 1600 km standard fibre, an accuracy of 1% is required in the channel separation, corresponding to 0.5 GHz uncertainty in the frequency of the individual signals. This may be difficult to achieve under practical operating conditions.

A more accurate method of measuring the net dispersion of a transmission line, using a single transmitter and incoherent receiver pair, will now be described.

The waveform synthesis capabilities of the transmitter described above enable single channel measurements of dispersion which are related to the data clock frequency, which will be known with much higher absolute accuracy than the differential optical frequency.

For example, consider transmitting an alternating sequence of ones and zeros. With simple ASK modulation and band-pass filtering, this generates a double sideband spectrum with modulation sidebands separated in frequency by half the symbol rate.

With control of amplitude and phase at the transmitter provided by the system described above, it is possible to generate the same intensity modulation as a single sideband waveform, with a spectrum dominated by the carrier and either of the upper or lower modulation sidebands.

In the presence of chromatic dispersion, the ASK modulation experiences a reduction in modulation amplitude. In contrast, with single sideband modulation, there is no reduction in modulation depth, but a phase shift proportional to the product of dispersion and modulation rate. The direction of the modulation phase shift is inverted for upper and lower single sideband signals. The phase shift of each sideband due to chromatic dispersion is:

$$\phi = \frac{\beta_2 L \Omega^2}{2} = -DL\frac{\lambda^2 \pi f_{mod}^2}{c} \quad (4)$$

For modulation frequency $f_{mod}$ 5 GHz, and net dispersion D.L 1000 ps/nm, the modulation phase shift is 0.63 radian, or 20 ps.

For 100 ps/nm dispersion, the phase shift is 0.06 radian, and the maximum change in sampled signal will be approximately 3% of the peak-peak modulation at the receiver. If the phases of upper and lower sideband modulations are compared, the peak signal difference is 6%, and this should be readily detected with even a 5-bit analogue to digital converter, and relatively little signal averaging. With more processing effort considerably better resolution should be possible.

With high net dispersion, exceeding ±5000 ps/nm, the periodicity in the measured phase shift will give ambiguous results, as the differential delay exceeds the modulation period of 200 ps. The true differential delay is equal to the measured phase shift plus an unknown integer multiple (k) of the 200 ps modulation period (T). If φ is the measured phase shift in radians, then the delay is:

$$\tau = \left(k + \frac{\varphi}{2\pi}\right)T \quad (5)$$

Figure 9:
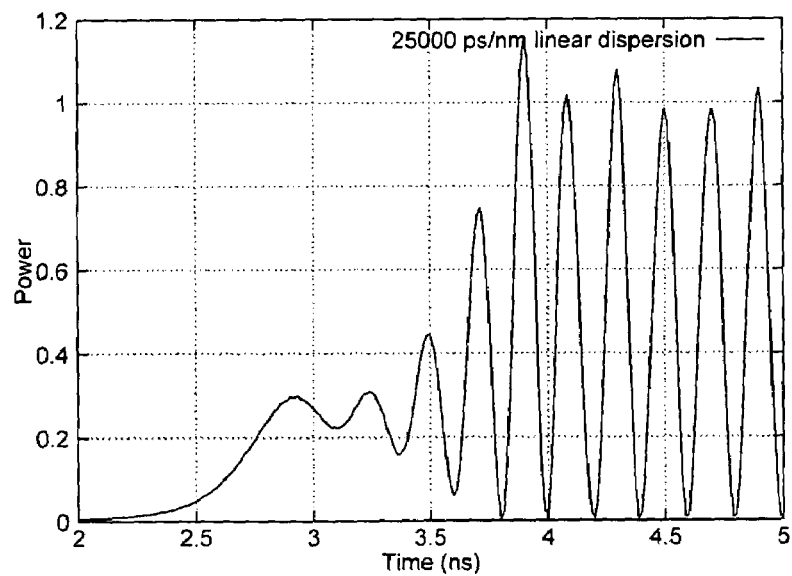

The ambiguity can be resolved by comparing the differential delays between the envelopes of predetermined upper and lower sideband modulated sequences. Even when the edge of the modulation envelope are heavily distorted (as shown in FIG. 9), the phase of the sinusoidal modulation in the centre of the envelope can still be estimated with moderate accuracy. We calculate the differential envelope delay $T_E$, estimate the number of cycles of phase slip, and round to the nearest integer:

$$k = \text{round}\left(\frac{T_E}{T} - \frac{\varphi}{2\pi}\right) \quad (6)$$

The exact delay can now be calculated from equation (5), then converted to an unambiguous phase shift, and the net dispersion (D.L) calculated from equation (4).

Expressed as bit sequences, the data modulated alternately on the two sidebands might be:

USB
00101010101010101010000000000000000000000000
LSB
00000000000000000000000010101010101010000

With positive net dispersion, the upper sideband (USB, shorter wavelength) sequence will be delayed less than the lower sideband (LSB) sequence.

Figure 10:
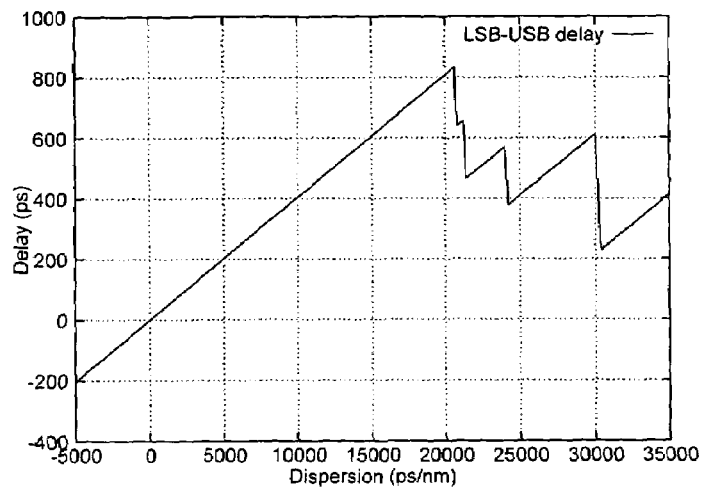
FIG. 10 shows the relationship between the differential delay between SSB tones and the dispersion.

An alternative approach is to use different modulation envelopes for the USB and LSB sequences, and cross-correlate the received waveform with the separate USB and LSB transmitted waveforms. The differential delay can then be estimated from the temporal separation of the cross-correlation peaks for the USB and LSB components. The simulated results of such a calculation are shown in FIG. 10.

Figure 7:
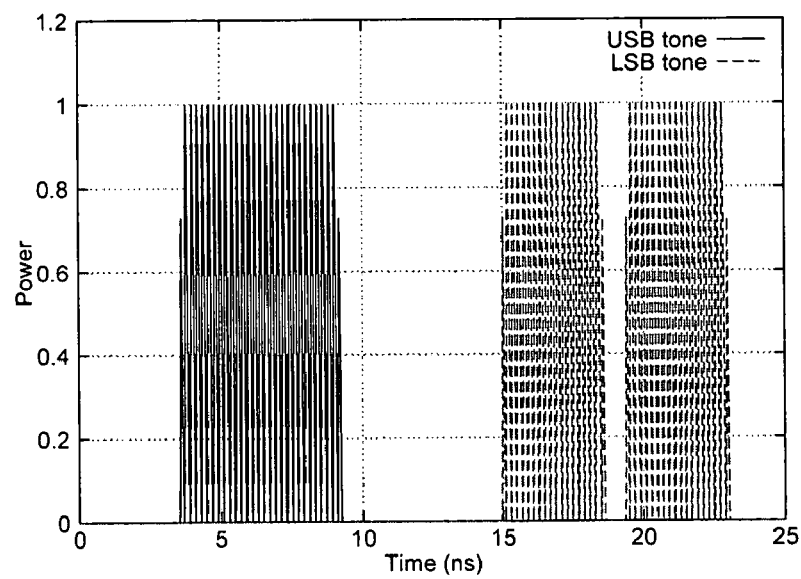
FIG. 7 is used to shows how single side band (SSB) modulation can be used to measure dispersion.
Figure 8:
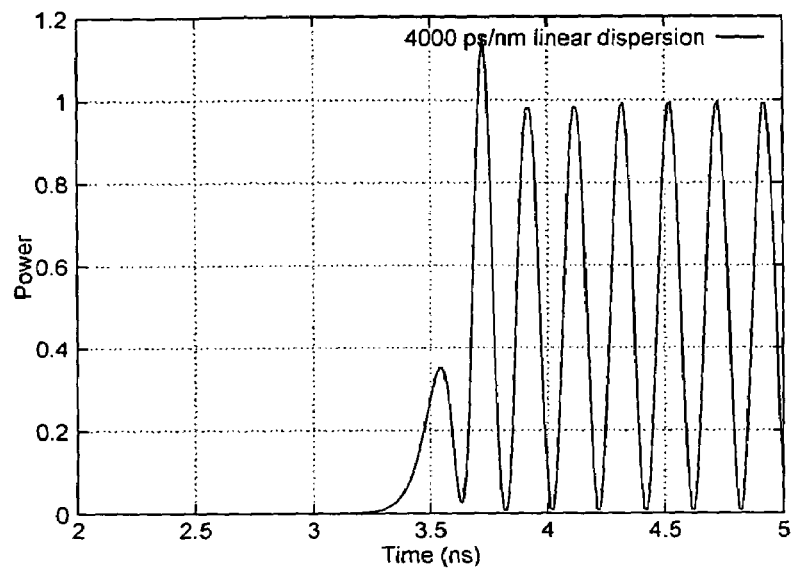
FIGS. 8 and 9 shows the effect of different amounts of dispersion on the SSB signals.

FIG. 7 shows a test waveform with alternate 5 GHz upper sideband and lower sideband modulation. USB and LSB sequences have different envelopes to simplify auto-correlation measurements. FIG. 8 shows the test waveform after 4000 ps/nm linear chromatic dispersion. FIG. 9 shows the test waveform after 25000 ps/nm linear chromatic dispersion.

At high net dispersion, there is significant waveform distortion at the start and end of the tone sequences, but the waveform settles to a well-defined tone within a few cycles, as shown in FIG. 9.

With the tone sequences shown here, the differential delay between the upper and lower sideband modulations can be measured by cross-correlating the received waveform with first the ideal USB envelope, and then the LSB envelope.

FIG. 10 shows the differential delay between the USB and LSB tones, as a function of linear chromatic dispersion.

At moderate net dispersion, a method of measuring delay by cross-correlation with the un-dispersed upper and lower sideband envelopes successfully resolves phase ambiguities when the differential delay exceeds the 200 ps modulation period. At higher dispersion, there are cycle slips, and errors which are multiples of the period. It should be possible to avoid the cycle slippage by estimating the differential delay in the envelope of the tone bursts. Alternatively, the cycle slips may be avoided by increasing the duration of the successive USB and LSB tones.

Figure 11:
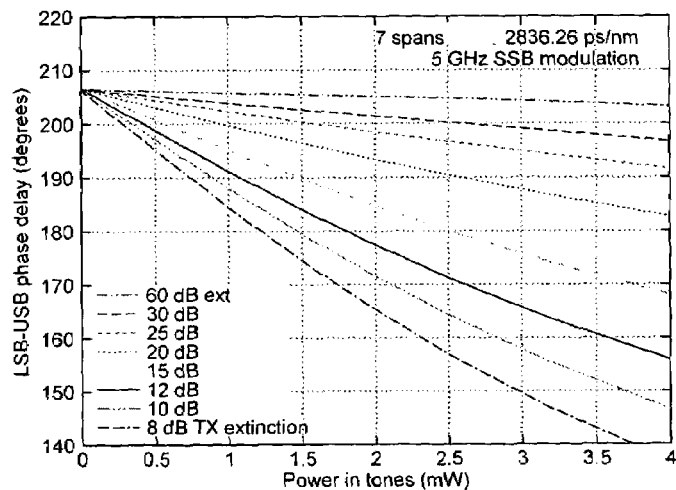
FIG. 11 shows how the phase delay between SSB tones varies with the signal power.

Equation (4) describes the differential delay between upper and lower sidebands for ideal single sideband modulation and linear propagation. With imperfect suppression of the unwanted sideband, the differential group delay is sensitive to Kerr effect phase distortion (SPM). FIG. 11 shows the approximately linear variation of differential delay with signal power for finite SSB (single side band) modulator extinction ratio. A more robust estimate of the distortion-induced delay is returned by measuring the differential delay ($T_1$, $T_2$) at two different power levels ($P_1$, $P_2$), for example 1 mW and 2 mW, and extrapolating to the delay at zero power.

$$T = T_1 - P_1 \frac{T_2 - T_1}{P_2 - P_1} \quad (7)$$

In one aspect, the invention uses this single side band modulation scheme to provide a measure of dispersion based on a single channel analysis. The transmitter is able to modulate an optical signal for transmission using this single side band modulation, and can alternate between upper side band modulation and lower side band modulation at different times. The differential delay between upper and lower side band modulations is then used by the receiver to determine the dispersion of the optical communications link.

As mentioned above, it is difficult to spatially resolve the non-linear contributions generated in different spans from the SPM distortion in a single 10 Gbaud channel. Cross phase modulation offers much better resolution. These XPM measurements are ideally taken at installation.

Figure 12:
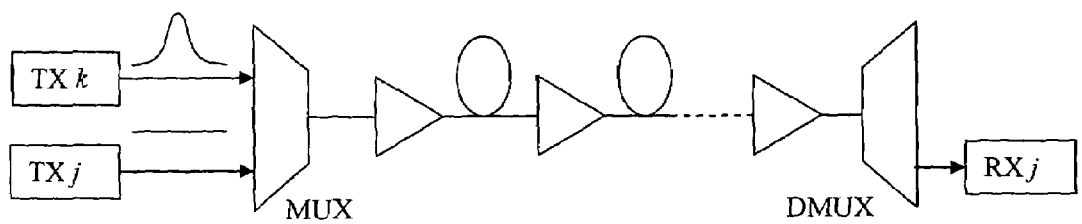
FIG. 12 shows how XPM measurements can be implemented in the transmitter and receiver.

FIG. 12 shows an XPM pulse/probe measurement scheme. Transmitters j, k operate at different wavelengths. Transmitter k transmits a narrow pulse. Transmitter j transmits a constant (CW) probe signal. Chromatic dispersion causes the pulse on channel k to propagate at a different speed to disturbances on the probe channel j. The differential delay increases as the product of fibre dispersion, channel separation and distance.

$$\frac{d\tau_{kj}}{dz} = D\left(\frac{\lambda_j + \lambda_k}{2}\right)(\lambda_k - \lambda_j) \quad (8)$$

The Kerr effect induces a phase shift in those parts of the probe signal j which overlap spatially and temporally with the interfering channel k pulse. The phase shift is proportional to the signal power, and so is high at the output of each line amplifier, and decays exponentially along each span. Walk-off between the channels converts the longitudinal variation in signal power into a temporal variation in phase shift.

Figure 13:
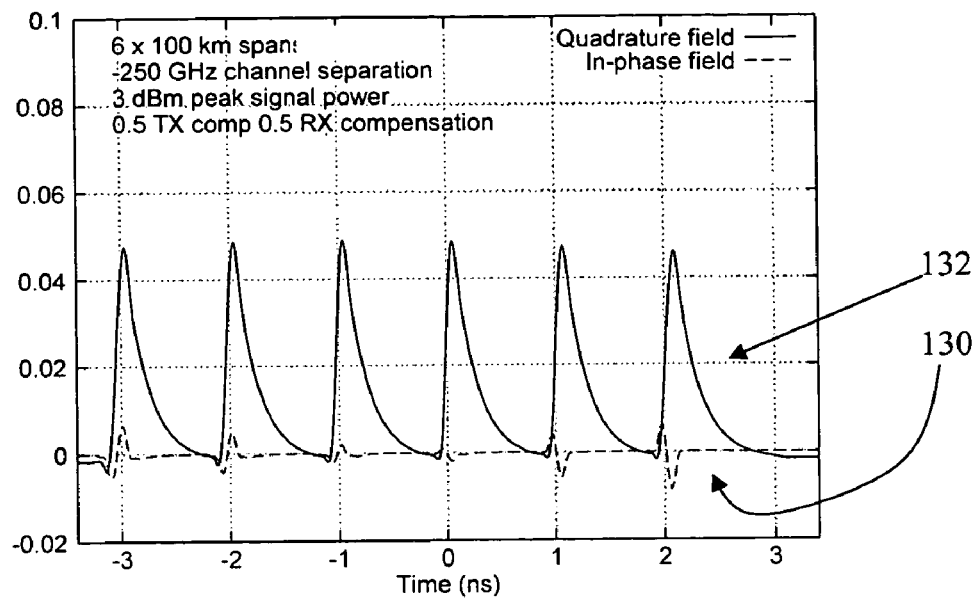
FIG. 13 shows the received signal distorted by XPM.

FIG. 13 shows how induced phase shift and amplitude variations are induced in 6×100 km spans of fibre with dispersion 5 ps/nm/km. Plot 130 shows the amplitude of the received XPM probe signal and plot 132 represents the phase. Channel separation of 250 GHz induces 1 ns walk-off per span. 50% linear dispersion compensation at each of the transmitter and receiver gives minimum pulse width at start of span 4 (0 ns).

As shown, as a result of the increased XPM at the amplifier outputs, the XPM phase signal provides a sequence of pulses, each representing the effect of one span on the signal. This provides a method of determining different span characteristics.

Figure 14:
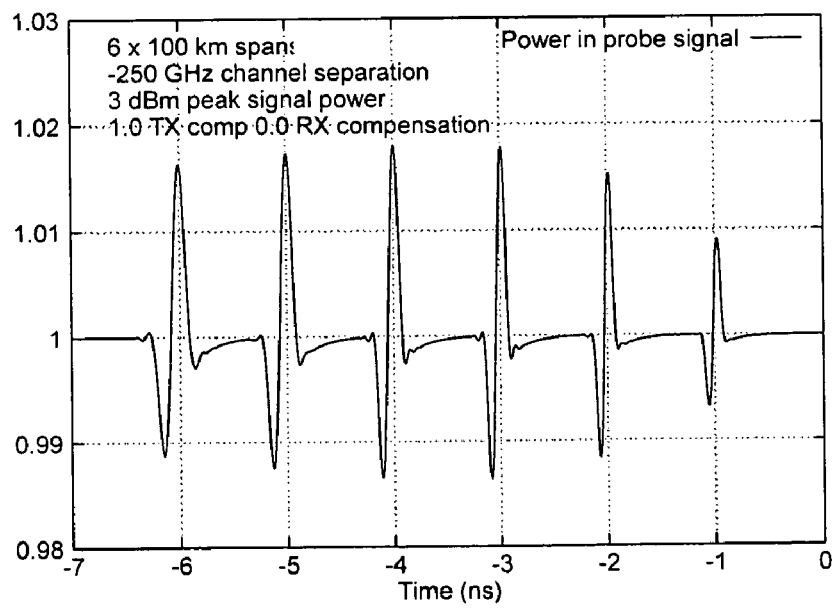
FIG. 14 shows the received signal distorted by XPM when pre-compensation for chromatic dispersion is employed.

FIG. 14 shows the power variations induced over 6×100 km spans of fibre with dispersion 5 ps/nm/km. In this case 100% dispersion compensation is provided at the transmitter. The power signal is essentially that which can be measured by an incoherent receiver. The magnitude of the received power variations depends on phase to amplitude conversion by the fibre chromatic dispersion. For small net dispersion, the PM-AM conversion is proportional to the square of the modulation frequency, so that the shape of the amplitude variations is close to a double-differentiation of the induced phase modulation. The magnitude is proportional to the net dispersion, from the nonlinearity to the receiver, so the contribution from span 6 (−1 ns in FIG. 14) is approximately half that from span 5 (−2 ns in FIG. 14). This is in contrast with FIG. 13, where, as a result of the dispersion compensation at the receiver, the in-phase perturbation from span 4 is minimised (0 ns).

At higher net dispersion, this relationship no longer holds. The interfering pulse is subject to chromatic dispersion, and broadens with distance from the optimum near the receiver. Consequently the induced phase modulation is also broadened, and has fewer high frequency modulation components. Furthermore, the PM-AM conversion rate varies sinusoidally with the square of the modulation frequency, so at high net dispersion, conversion to intensity modulation saturates.

From equations (8, 17) it is evident that the difference in arrival time between pulses induced in successive spans is equal to the product of channel separation (in nm) with net dispersion (in ps/nm) of the intervening span. The signal shown in FIG. 14 thus provides a method of determining from the received signal a net dispersion measurement for each span.

Figure 15:
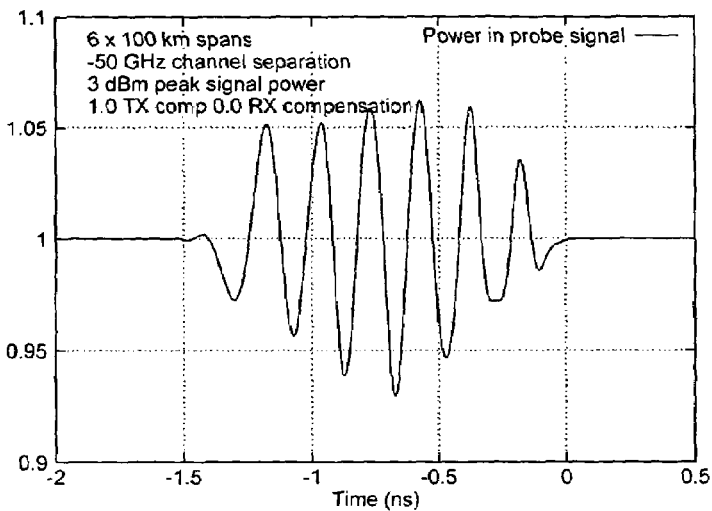
FIG. 15 shows the shows the received signal distorted by XPM when reduced channel separation is used.

The power modulation is much weaker than the phase modulation. The strength of the phase modulation can be increased by operating with a smaller channel separation to reduce attenuation of the phase distortion by walk-off. FIG. 15 shows a simulation for 50 GHz channel separation. The modulation amplitude is increased, but there is poorer resolution of the spatial variations. In all cases, the pulse shape launched by transmitter k is a raised cosine.

The use of a digital coherent receiver enables improved measurements to be obtained, instead of simply the power envelope being detected. In particular, as shown in FIG. 13, the phase crosstalk from XPM is generally larger than the amplitude crosstalk. The phase signal is more simply related to the line properties, especially if optical, electrical or digital chromatic dispersion compensation is used to unscramble the PM/AM conversion for the contribution from each span. Thus, the use of a digital coherent receiver enables better analysis than an incoherent receiver.

For a narrow interfering pulse of width w and energy u, the peak phase shift in the low dispersion limit is approximately:

$$\phi_0 = \frac{Ku}{w} L_{eff} \quad (9)$$

$L_{eff}$ is the effective non-linear interaction length, related to the fibre attenuation coefficient, $\alpha$. For a long uniform fibre span:

$$L_{eff} = \int_0^L e^{-\alpha z} dz = \frac{1 - e^{-\alpha L}}{\alpha} \approx \frac{1}{\alpha} \quad (10)$$

The non-linear coefficient K depends on the relative polarisation orientations of the pulse k and probe j signals. It is related to the fibre non-linear coefficient $\gamma$ by:

$$2\gamma \geq K \geq \gamma \quad (11)$$

where the fibre non-linear coefficient is proportional to the Kerr coefficient (non-linear index) and inversely proportional to the fibre effective area:

$$\gamma = \frac{2\pi n_2}{\lambda A_{eff}} \quad (12)$$

$K=2\gamma$ for co-polarised signals, and $K=\gamma$ for orthogonally polarised signals. This variation with polarisation state makes it difficult to make unambiguous estimates of provisioned powers from individual XPM measurements.

In the presence of dispersion, the phase response is broadened by walk-off. For a narrow interfering pulse, and a long uniform fibre span, the walk-off is given by:

$$W(t) = \begin{cases} 0 & (t\tau < 0) \\ \frac{1}{|\tau|} \exp\left(-\frac{t}{\tau}\right) & (t\tau \geq 0) \end{cases} \quad (13)$$

$$\tau = \frac{D\Delta\lambda_{kj}}{\alpha} \quad (14)$$

Where D is the fibre dispersion coefficient and $\Delta\lambda_{kj}$ is the wavelength separation between the two channels k,j.

More generally, the phase response is given approximately by the convolution of the interfering pulse shape and the walk-off. This is not exact because dispersion will change the pulse shape during the walk-off process, but it is an excellent approximation.

$$\phi(t) \approx p_k(t) * W(t) \quad (15)$$

where '*' denotes the convolution operation between the interfering pulse power envelope and the walk-off response.

$$\phi_{span} \approx \frac{Ku}{\alpha\sqrt{w^2 + \tau^2}} = \frac{Ku}{\sqrt{\alpha^2 w^2 + D^2 \Delta\lambda^2}} \quad (16)$$

Walk-off between successive spans $\Delta t_{span} = D\Delta\lambda_{kj} L_{span}$ (17)

For a uniform span with constant fibre attenuation and dispersion:

$$\alpha L_{span} = \frac{\Delta t_{span}}{\tau} \quad (18)$$

$$D = \frac{\alpha\tau}{\Delta\lambda_{kj}} \quad (19)$$

The dispersion coefficient can therefore be estimated from measurements of the decay rate τ.

In the 'high walk-off' regime, τ>>w, and the peak phase shift is dominated by the pulse energy, the dispersion and the channel spacing.

$$\lim_{\tau \to \infty} \phi_{span} \approx \frac{Ku}{D\Delta\lambda} \quad (20)$$

If the polarisation orientation is substantially unchanged between spans, changes in fibre dispersion can be identified from variations in peak phase shift.

More generally, if the walk-off time constant, τ, is large compared with the pulse width, w, it is possible to resolve intra-span variations in dispersion or attenuation.

The results above are explained graphically with reference to FIG. 16, which is a simulation based on the same conditions to FIG. 13, with variations in the dispersion of spans 1, 3 and 5, as shown below:

Span 1: Length 80 km, dispersion 4 ps/nm/km for first 30 km and 6 ps/nm/km for last 50 km Span 2: Length 100 km, dispersion 5 ps/nm/km Span 3: Length 100 km, dispersion 4 ps/nm/km Span 4: Length 100 km, dispersion 5 ps/nm/km Span 5: Length 75 km, dispersion 8 ps/nm/km for first 25 km and 4 ps/nm/km for last 50 km Span 6: Length 100 km, dispersion 5 ps/nm/km All spans have the same loss (0.215 dB/km) and dispersion slope.

Figure 16:
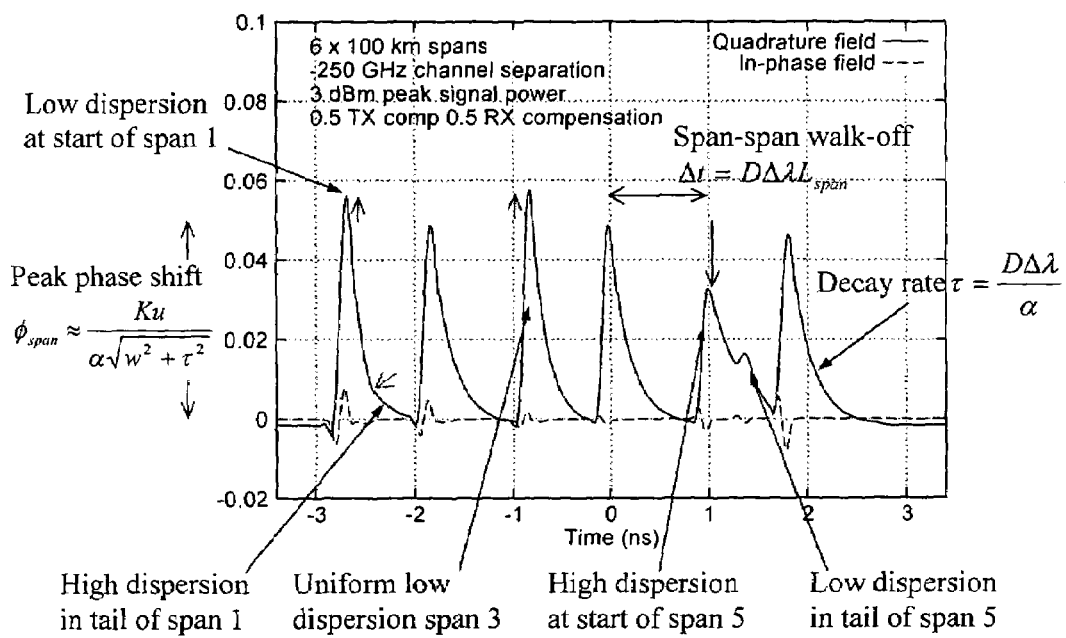
FIG. 16 shows how the received signal distorted by XPM can be used to derive per-span characteristics.

FIG. 16 shows the phase response when there are intra- and inter-span variations of fibre dispersion from a nominal 5 ps $nm^{-1} km^{-1}$.

As shown in FIG. 16, the rate of decay of each Quadrature pulse can be used to provide an estimation of dispersion at a location within a span. From equation 11, the separation between pulses provides a measure of the net dispersion for the complete span. $D.L_{span}$ is calculated by dividing the pulse separation by the channel separation.

At narrow channel separations, there may be some uncertainty in the exact channel separation, and at 50 GHz separation an error of 10 GHz would result in 20% error in the dispersion estimate for each span. This uncertainty can be reduced by an independent measurement of the net dispersion in the line, such as the alternate single sideband method described previously. Under favourable conditions, there may be an identifiable phase perturbation from both the start and the end of the span nearest the receiver. More usually, the XPM technique will give identifiable signals only from the start of each span. Under these conditions, it will be necessary to estimate the length and net dispersion of the final span. For N spans with approximately equal length and dispersion coefficient, a good estimate of the channel separation is $$\Delta\lambda_{kj} = \frac{\sum_{span=1}^{N-1} \Delta t_{span}}{D_{LINK}} \frac{N}{N-1} = \frac{t_N - t_1}{D_{LINK}} \frac{N}{N-1} \quad (21)$$

Where D LINK is the net dispersion of the link, and tN is the arrival time of the pulse corresponding to the $N^{th}$ span.

The energy in the phase crosstalk induced in each span is proportional to the product of interfering (channel k) pulse energy, and the fibre XPM non-linearity coefficient. In the high walk-off regime (where the distortions from adjacent spans are reasonably distinct):

$$\int_{t_n}^{t_{n+1}} \phi \, dt = Ku L_{eff} \quad (22)$$

where the effective length, $L_{eff}$ of each span, n, is given by equation (10), and depends on the fibre attenuation.

It is difficult to separate the effects of dispersion changes from variations in attenuation coefficient. In some cases, the length and net attenuation of each span will be known, and an average attenuation coefficient employed. For many systems, the expected range of fibre attenuation coefficient values will be small, ±10% for example (e.g. 0.20 to 0.25 dB/km), and the nominal or average value can be substituted. In systems known to employ standard single mode fibre, with a large number of splices of uncertain attenuation, it may be more appropriate to assume a nominal value for the fibre dispersion, and calculate the attenuation from the variation in XPM crosstalk.

If the attenuation is known, then we can calculate $L_{eff}$ from (10) and the XPM phase energy, Ku, from (22).

In the high walk-off regime, the dispersion coefficient, D, can be calculated from Ku, the peak phase shift, $\phi_{span}$, and the channel separation, $\Delta\lambda_{kj}$, using equation (20).

It will be apparent that information can be extracted from the measured response in other ways, either using equations (9-20), or a more detailed model of the XPM interaction and subsequent non-linear propagation, together with parameter fitting techniques well-known in the practice of signal processing and numerical analysis. The most appropriate method will depend on the extent to which parameters such as power, span length or attenuation are known from independent measurements, and on the signal to noise ratio, and processing power available.

The peak pulse height represents approximately 5% of the signal amplitude for the conditions used in FIG. 16. Under typical operating conditions, this may be less than the root mean square noise, so measurements on a single pulse will not give accurate results. For acceptable results, it will generally be necessary to record the response to a sequence of pulses, and calculate the average response. The cross-correlation technique described below for in-service measurements can also be applied to measurements on a CW probe, with the difference that there is no signal modulation to be removed. Such a cross-correlation analysis allows the average response to a large number of pulses to be measured relatively quickly.

Calculating the average response from multiple interfering pulses avoids another potential problem. Fast A/D converters, able to operate at 20 G samples/s, typically offer a limited resolution of between 4 and 8 bits. If the range from −1.5 to +1.5 times the root mean square (RMS) signal field is covered by a 6-bit converter (64 levels), then the resolution is approximately 5% of the RMS field. This is comparable with the magnitude of the XPM-induced phase distortion. For a single pulse measurement, the quantisation error would be very large. Averaging the responses to a large number of pulses in the presence of noise which is larger than the quantisation step, effectively interpolates between the quantisation steps.

The intensity (power) crosstalk is typically much weaker than the phase crosstalk, so XPM signal levels are lower for an incoherent receiver. In links with high net dispersion, there is substantial broadening of the signal pulses, degrading the resolution, and further reducing the modulation amplitude.

Figure 17:
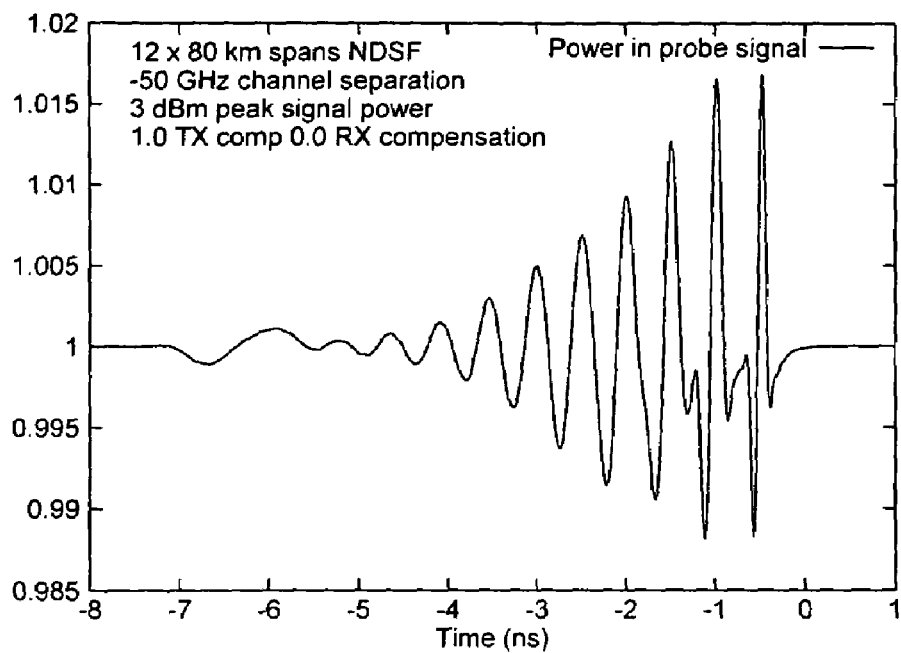

FIG. 17 shows the intensity crosstalk predicted for 12×80 km NDSF spans with 100% linear compensation at the transmitter. The dispersion compensation has greatly broadened the pulse at the transmitter, so that the perturbations from the first spans overlap (−6 to −7 ns). The spatial resolution can be improved by increasing the channel separation, as shown in FIG. 18, but this is at the expense of reduced modulation amplitude.

Figure 18:
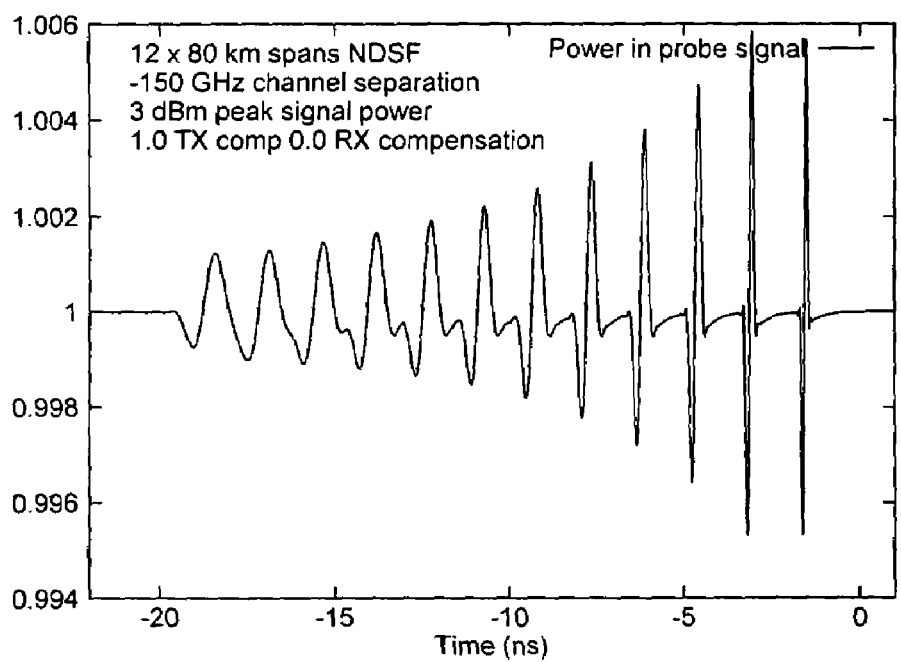

In FIG. 18, the channel separation is increased to 150 GHz to improve spatial resolution.

As can be seen from the above, it is possible to vary the proportion of dispersion compensation provided at the receiver and at the transmitter. By varying the dispersion compensation at the transmitter, and providing partial compensation in the transmitter and in the receiver, it is possible to ensure that the interfering pulse is narrow at each of the spans in turn. Scanning the proportion of compensation in the receiver and transmitter improves the resolution for crosstalk from selected spans. Comparing the responses with fixed transmitter compensation and variable receiver compensation may allow more detailed or more accurate information to be extracted—scanning the receiver compensation allows the magnitude of the phase modulation to be estimated in direct detection receivers.

Figure 19:
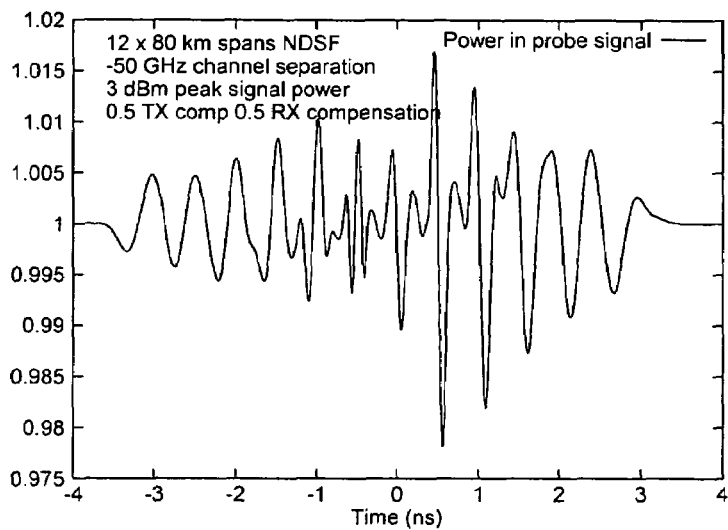

As a further example, FIG. 19 shows 50 GHz channel separation. Transmitter and receiver both compensate for 50% of total chromatic dispersion.

Figure 20:
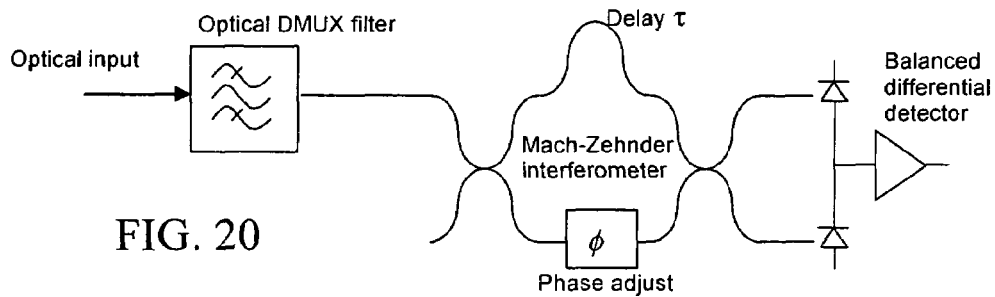
FIG. 20 shows how an interferometer can be used to obtain phase information instead of a full coherent optical receiver.

More complete information is available, and a better signal to noise ratio is possible, when the receiver detects both amplitude and phase noise. As an alternative to a coherent detector, a Mach-Zehnder demodulator can be used to detect changes in the phase of the probe, without the complexity of coherent detection. FIG. 20 shows such a demodulator, as might be used to demodulate differential phase shift keyed (DPSK) signals.

The balanced detector scheme reduces the sensitivity to amplitude modulation. An alternative is to collect both amplitude and phase information, for example by sampling the output from the two detectors independently, and scanning the differential phase. A further alternative is to use multiple MZ demodulators with different phase differences. Such a configuration with two demodulators and +45° and −45° phase differences is used to detect DQPSK modulated signals.

Figure 21:
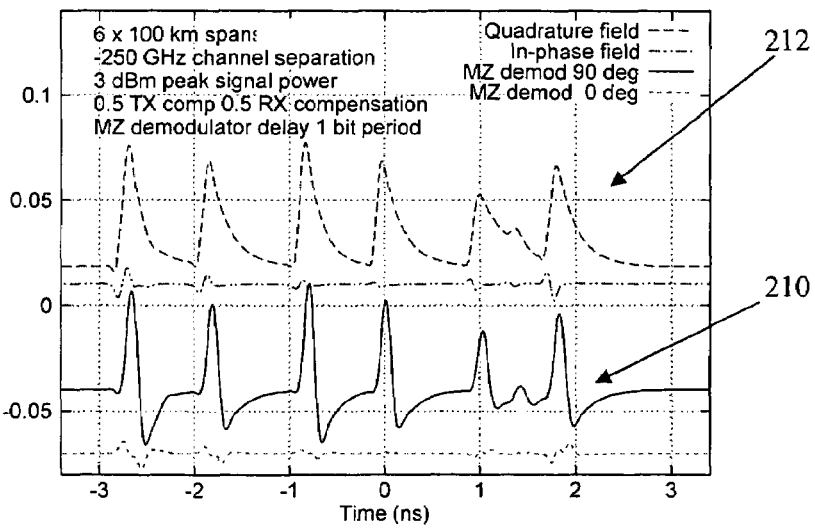
FIG. 21 compares the interferometer output with a coherent optical receiver output.

FIG. 21 shows XPM probe detection by Mach-Zehnder demodulator (plot 210) compared with direct coherent detector measurement (plot 212). Plot 212 corresponds to FIG. 16. The differential delay between the two arms of the Mach-Zehnder is 100 ps. With 90° differential phase in the demodulator, the output is close to the differential of the pure phase response.

Figure 22:
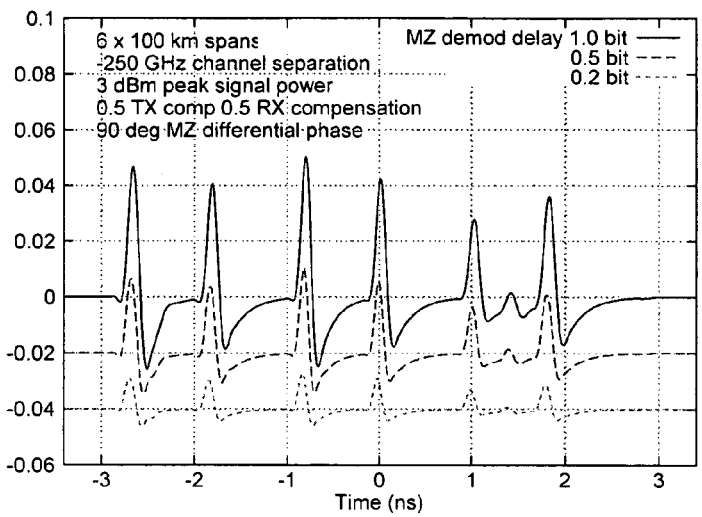
FIG. 22 shows the effect of varying differential delay on the output shown in FIG. 21.

FIG. 22 compares the output with 90° differential phase, for different values of differential delay. The waveform shapes remains similar, but the amplitude decreases roughly in proportion to the delay.

If polarisation control is provided at the transmitter, then spatial resolution of variations in the signal power is possible. From equations (9) and (11), the strength of the XPM interaction varies by a factor of two, depending on the relative polarisation orientations of the probe and pulse signals. If the polarisation state of either of the signals can be controlled at the transmitter, then the relative polarisations at an intermediate line amplifier site can be varied, and the uncertainty in the non-linear coefficient K resolved. If the fibre attenuation is known or estimated, then the local product of dispersion coefficient and channel separation can be derived from the decay rate. The pulse energy, and hence the local signal power is then determined from equation (16). Alternatively, from (20), $$\frac{K}{D\Delta\lambda}$$

is a direct measure of the susceptibility to XPM crosstalk in this span, and can be used to optimise the provisioned power in XPM-limited systems.

Similarly, if polarisation control is provided at the transmitter, then spatial resolution of the PMD is possible. Polarisation mode dispersion (PMD) arises from birefringence in both fibre and other optical components, usually combined with random mode coupling between the polarisation eigenmodes, which travel with different group velocities.

First order PMD arises from the differential group delay between polarisation eigenmodes, equivalent to splitting the signal into two components, and delaying one with respect to the other. In a typical system the differential group delay (DGD) varies with time, and for strong polarisation mode coupling is described by a Maxwell probability distribution system. The instantaneous DGD can be appreciably larger (~4× higher) than the mean. Significant eye closure is possible when the DGD is comparable with the bit period.

In strongly coupled systems, higher order PMD is likely to be significant. The principal states of polarisation (PSP), for which the output state varies relatively slowly with input optical frequency, vary significantly for large frequency deviations, and the DGD is also frequency dependent. This causes additional impairments, in a manner similar to variable chromatic dispersion for different parts of the propagated waveform. Another effect is to induce a frequency-dependent polarisation rotation, which further degrades the received waveform.

If the polarisation state of both pulse and probe waveforms can be adjusted at the transmitter, then the change in relative orientation from one span to the next can be interrogated by recording the relative polarisation movement at the transmitter to minimise or maximise the XPM interaction. Control of both signal states is necessary since the relative polarisation rotation depends on the orientation of both signal states with respect to the principal polarisation states of the segment of the link under investigation.

Some systems are subject to penalties arising from polarisation dependendent loss (PDL) or gain in the transmission line. The most usual cause is polarisation-selective losses in line amplifier components. If the launch polarisations at the transmitters are adjusted to maximise the magnitude of the XPM interaction from a selected span, and the polarisation state of the composite signal adjusted at the transmitter, maintaining a relative orientations between the two signals which maximise the XPM magnitude from the selected span, then the variation of XPM phase shift is proportional to the variation in interfering channel signal power at the start of the selected span. By measuring the polarisation state dependence of XPM, for each span in turn, the evolution of polarisation dependent loss along the system can be determined.

Figure 23:
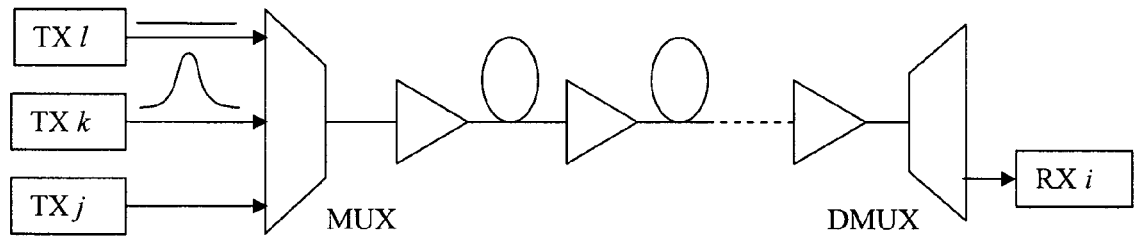
FIG. 23 shows how FWM measurements can be implemented in the transmitter and receiver.

Four wave mixing provides a further analysis tool. FIG. 23 shows a FWM pulse/CW probe measurement scheme.

Four wave mixing is a parametric interaction between three optical signals to generate energy at a fourth optical frequency. Two of the input signals may be identical, in which case the interaction is referred to as 'partially degenerate'. In fibre the interaction is via the Kerr effect which is responsible for both self-phase modulation (SPM) and cross-phase modulation (XPM). The instantaneous field growth is comparable to that for XPM, although the net FWM field is weaker than the equivalent XPM induced field (by a factor proportional to the ratio of bit rate to channel separation).

Four wave mixing only occurs when power is present on all of the input wavelengths, so spatially resolved information can be recovered by transmitting pulsed signals at two different wavelengths, and recording the FWM power at the product wavelength. By adjusting the differential delay at the transmitter, the location at which the pulses overlap is varied.

One feature of pulsed FWM measurements is that for 'complete' collisions, where the pulse overlap occurs entirely within a uniform fibre segment, the collisions are largely elastic. The FWM field envelope builds as the pulses approach, with oscillations in the field at a rate determined by the phase mismatch $\Delta k$. When the pulses are aligned, the peak FWM field is similar to that predicted from the peak powers in the individual signals. As the pulses separate, the power continues to oscillate smoothly, and the peak FWM field decays to a small value.

Strong FWM will occur for collisions which occur at discontinuities in the product of signal power and non-linear coefficient, and at dispersion discontinuities. A strong response is generated at the output of each line amplifier, and a smaller response where the fibre dispersion or effective area changes. FWM analysis at installation provides a further or alternative analysis tool for obtaining spatial characteristic information concerning the optical transmission line.

A wide optical frequency separation improves spatial resolution, but degrades sensitivity. FWM power is a maximum when the pulses overlap completely at the output of a line amplifier, and is then approximately equal to the CW FWM power from a long uniform fibre span.

In links with high net dispersion, the pulse width will vary along the fibre. Tunable dispersion pre-compensation allows the pulse width to be minimised at the location of the overlap. With a tuneable transmitter such as described above, this can be varied to maintain spatial resolution as the differential delay is scanned.

One potential advantage of a multiple pulse measurement is that the FWM power need not be measured by sampling at the data rate. The signal can be sampled at a small multiple of the pulse repetition rate and synchronous processing or analogue lock-in detection used to improve the signal to noise ratio.

If alternatively only one of the pump signals is pulsed, and the remaining signals are unmodulated, then for each pulse a train of output pulses is derived corresponding to interactions at each line amplifier site, with smaller pulses at dispersion discontinuities.

Figure 24:
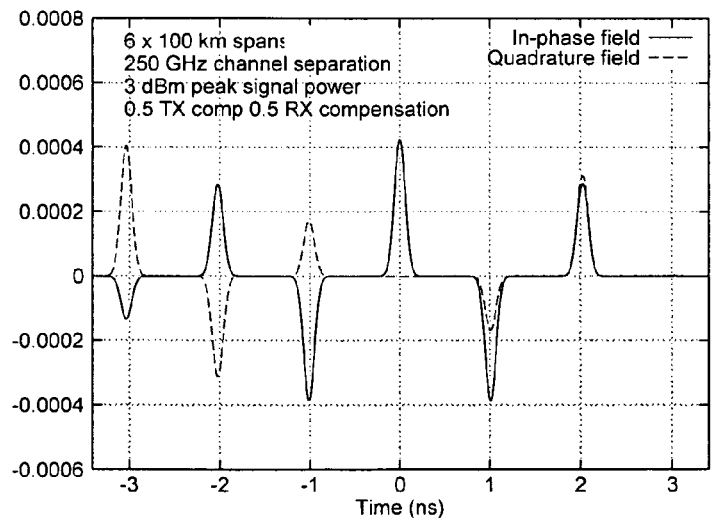
FIGS. 24 and 25 show the FWM field for a uniform dispersion map and for the dispersion map used for the analysis of FIG. 16.

FIG. 24 shows the predicted field (both I and Q components) for a 3-wavelength measurement on a uniform dispersion map, as used in the XPM simulation shown in FIG. 13. In FIG. 13, channel 1 at +250 GHz (above the probe channel frequency) is pulsed, and channel 3 is a CW channel at −250 GHz. The FWM field is measured on CW probe channel 2 at 1550 nm (+0 GHz i.e. the reference frequency).

Figure 25:
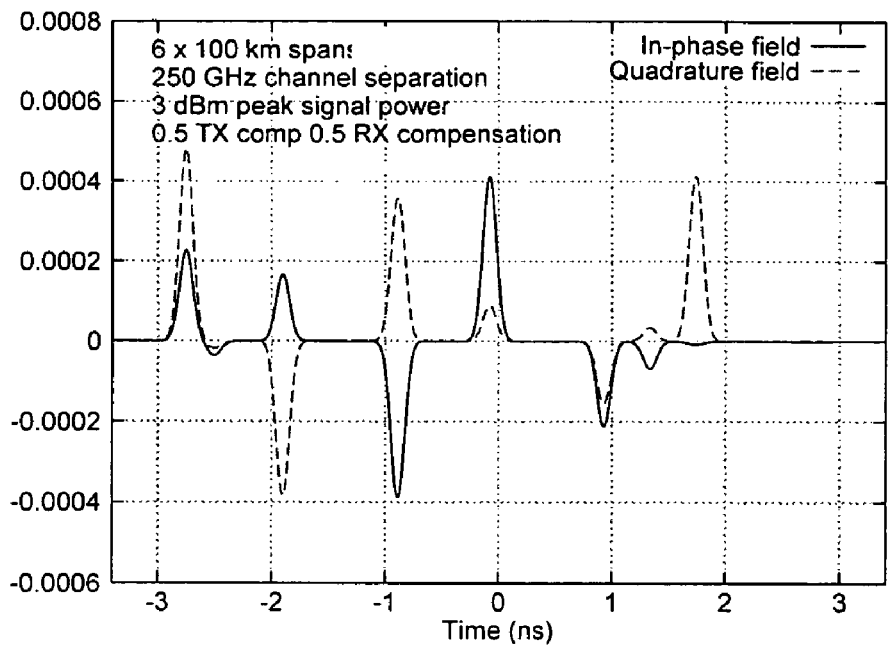
Figure 26:
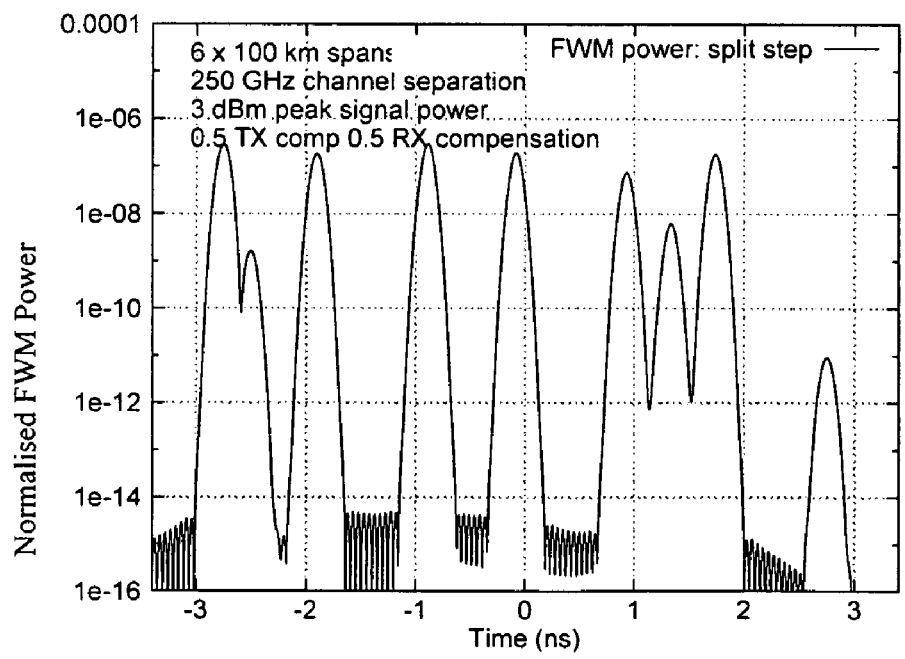
FIG. 26 shows the FWM power corresponding to FIG. 25.

FIG. 25 shows the equivalent results for a perturbed dispersion map, as modelled in FIG. 16. There are variations in pulse height corresponding to the changes in local dispersion, and additional smaller pulses at the intra-span dispersion discontinuities. FIG. 26 shows the FWM power on a logarithmic scale.

The results of FIGS. 25 and 26 thus provide a further analysis tool for obtaining information relating to individual spans of the optical transmission link.

The phase of the FWM field depends on the exact optical frequencies of the interacting signals, and will change at a rate depending on the frequency difference between the product and local oscillator frequencies, and on the line width of the contributing signals.

In summary, FWM offers potentially better selectivity compared with XPM, but the FWM signal may be too small in high dispersion systems. The FWM signal is always smaller than the XPM field at comparable channel spacing, so XPM may be preferred as a diagnostic tool.

The description above has focused on measurements that may be made at installation of the system. XPM in particular may also be used for in-service measurements.

If the transmitter can transmit arbitrary amplitude and phase, and a digital coherent receiver is able to detect in-phase and quadrature signals, then better transmission performance can be obtained with a phase shift keyed (PSK) signal than with non-return-to-zero (NRZ) intensity modulation (amplitude shift keying, ASK). Whatever the modulation format, the instantaneous magnitude of the phase crosstalk arising from XPM depends on the instantaneous power envelope in the interfering channel. In high dispersion links, the peak to mean power ratio of PSK waveforms will be at least as high as for NRZ intensity modulation. However, the modulation will consist predominantly of high frequency components, of the order of the symbol rate. These are attenuated by inter-channel walk-off at channel separations wide enough to provide useful spatial resolution, reducing the sensitivity for PSK modulation formats.

The received probe waveform (j) after phase modulation can be represented by:

$$\text{Phase modulated signal } A_j(t) = \overline{A}_j(t)\exp(i\phi_k) \quad (23)$$

Where $\overline{A}_j(t)$ is the received signal in the absence of XPM crosstalk. It can be estimated from the known transmitter waveform and the net dispersion in the transmission line. A complication is that the received signal will include SPM induced phase and amplitude distortion which depends on the dispersion and power distribution in the transmission line, which will not be known precisely. In highly dispersive systems, the SPM distortion will depend on the field in neighbouring pulses, so a simple average is unlikely to be accurate. An alternative method of estimating $\overline{A}_j(t)$ at the receiver is to measure a long data sequence including multiple instances of the bit pattern surrounding each pulse of interest, and to average the signal fields from only those pulses which are surrounded by the same pattern of bits as the current target pulse. The difference between the recorded field and the average crosstalk-free field gives a reasonable estimate of the XPM field amplitude, and is related to the XPM phase shift by:

$$\text{XPM amplitude } A_j(t) - \overline{A}_j(t) \approx i\phi_k \overline{A}_j(t) \quad (24)$$

The aim is to derive a signal which provides the XPM phase change information. This can be obtained by multiplying the estimated XPM field by the complex conjugate of the averaged probe waveform:

$$i\phi_k P_j(t) \approx \{A_j(t) - \overline{A}_j(t)\}\overline{A}_j^*(t) \quad (25)$$

Correlating this processed crosstalk waveform with the power envelope of the interfering channel (k) derives a signal which can be used to estimate the XPM phase distortion:

$$C(t) = \text{Corr}(\{A_j(t) - \overline{A}_j(t)\}\overline{A}_j^*(t), P_k) \quad (26)$$

In these equations, the interfering channel is $P_k$, and this can be a single pulse or other defined modulation pattern, or it can be the in-service data on the particular channel frequency. Thus, in-service measurement of XPM can be obtained. The probe signal is $A_j$, and this is the channel which is measured. The bit sequences on the channels will be known, and by averaging the waveform on the probe channel (j), the complex conjugate of the averaged probe field can be obtained and used to process the measured signal as described above. Similarly, the average power waveform of the interfering channel can also be determined from the known data on the relevant channel. This data can be provided either as a bit sequence, or as a digitized waveform, sampled and recorded by the receiver for the interfering channel.

Typically, the receiver will be able to store only a limited sequence of waveform samples, so a means is required to synchronise the sampling process with the data transmitted in the interfering channel. In most optical communications systems, data is transmitted as a sequence of frames of known length. For the well-established SDH and SONET protocols the details of the frame are defined in international standards. Proprietary formats may be used when forward error correction is used. In any case the start of each frame carries a recognisable bit sequence or other signature, and the receiver will implement means to detect the frame header. The differential delay between the frames transmitted in the two channels can be measured at either transmitter or receiver, and a suitable protocol used to establish a delay after the start of each frame at which the recording of samples is to begin. Provided there is sufficient temporal overlap between the probe and interfering channel sample sequences, the precise offset between the two can be calculated using correlation techniques well-known in signal processing practice, and similar to those described above. If there are large variations in communication delay between the transmitters or receivers, then multiple sample sequences can be recorded with different differential offsets from the frame header, until a usable overlap is detected by correlation or other processing techniques.

Figure 27:
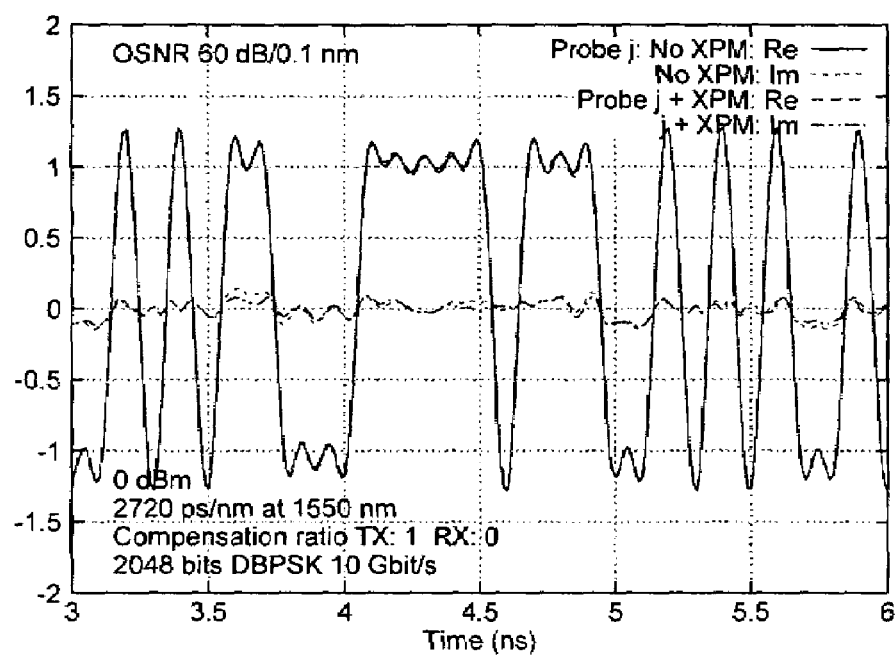
FIG. 27 shows how XPM affects in-service data.

FIG. 27 shows a simulation of the received DBPSK waveforms, with and without XPM crosstalk, and with no optical or electrical filtering.

Figure 28:
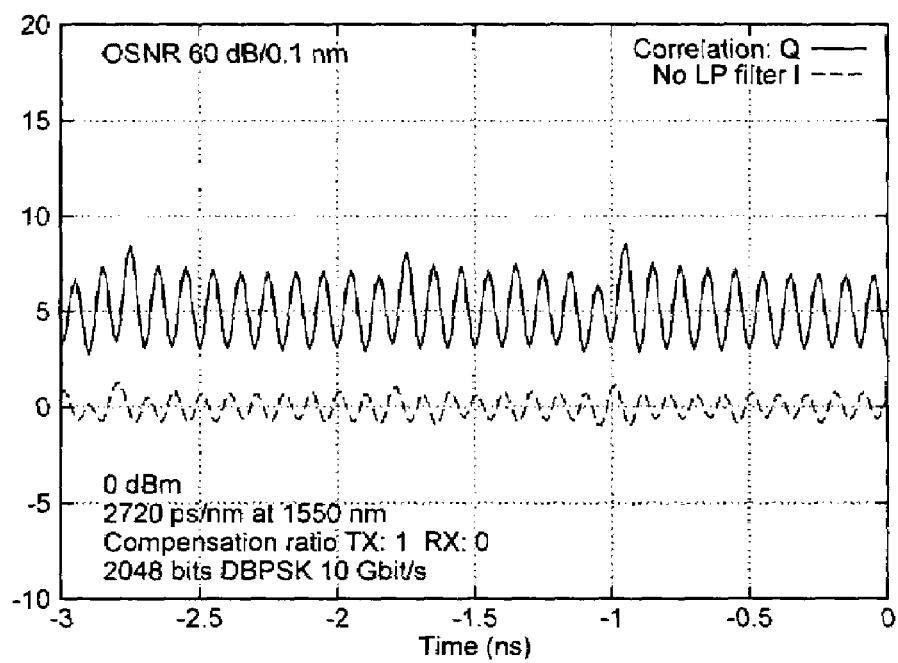
FIG. 28 shows a correlation waveform used for analysing the in-service XPM effect.

FIG. 28 shows the correlation of crosstalk with transmitted power envelope (i.e. the signal represented by equation (26)), for the I and Q components, and shows a strong contribution at the 10 GHz symbol rate.

Figure 29:
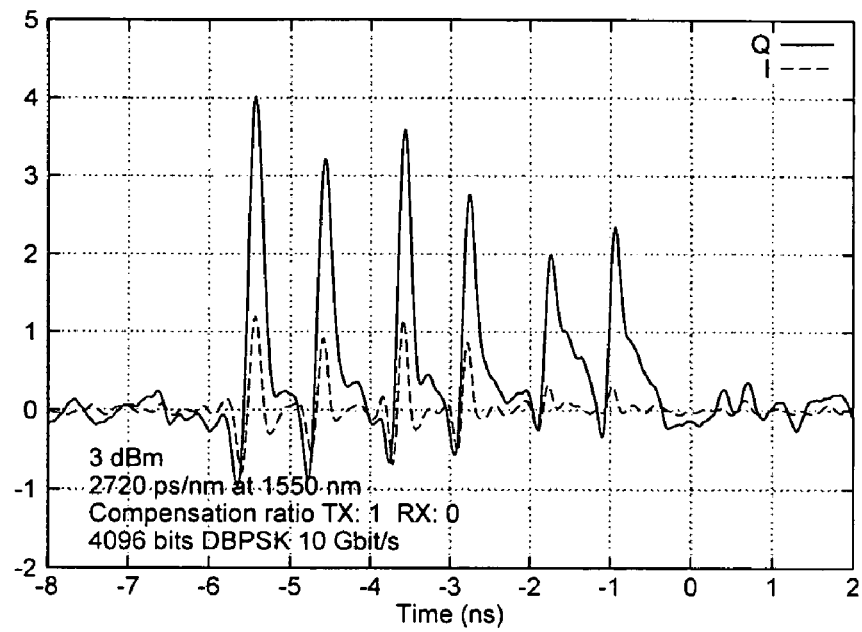
FIGS. 29-31 show the correlation waveform after low pass filtering for different chromatic dispersion compensation schemes.

This can be suppressed by appropriate low pass or notch filtering, or by re-sampling the waveform to eliminate the transitions between adjacent symbols. FIG. 29 shows a simulation result, after low pass filtering. It can be seen that the in-service XPM analysis reveals characteristics corresponding to those revealed by FIG. 16. In FIG. 29, the transmitter carries out full chromatic dispersion pre-compensation.

Figure 30:
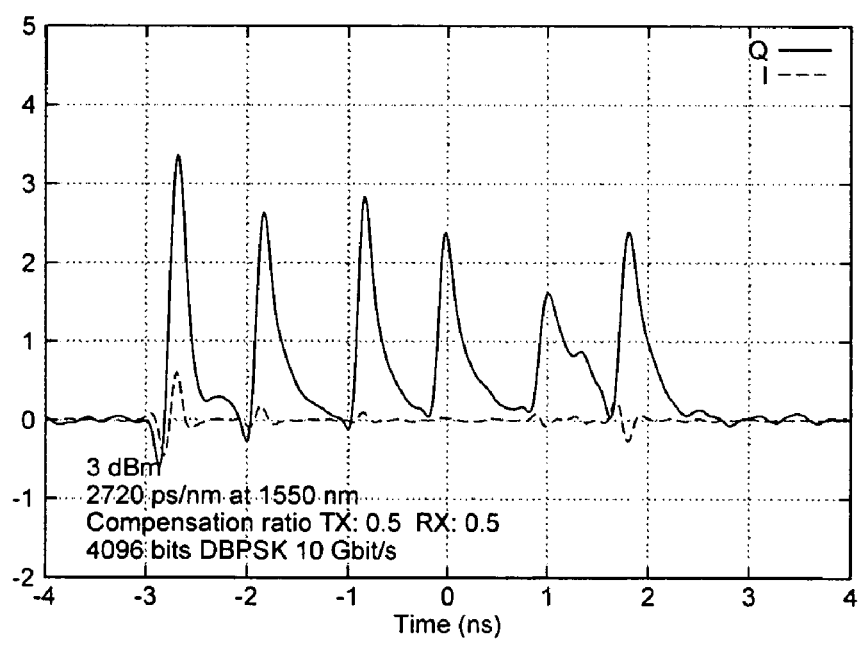
Figure 31:
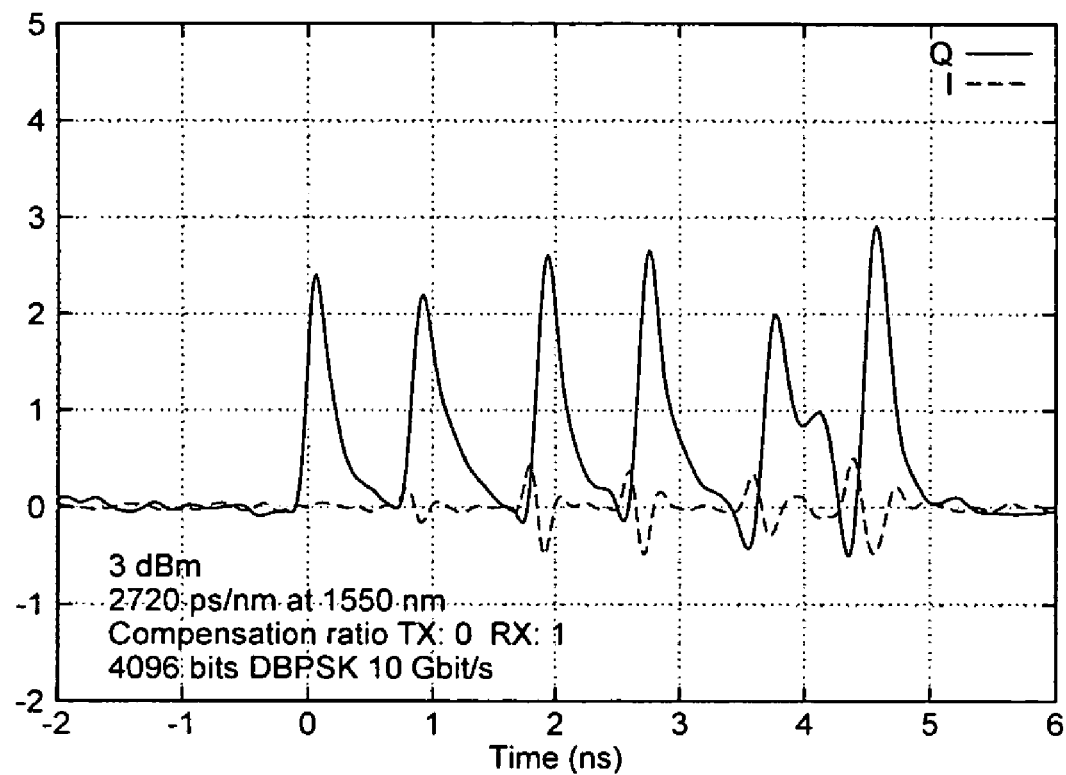

FIG. 30 shows how the response of FIG. 29 varies when the dispersion compensation is shared between the transmitter and receiver (50% each) and FIG. 31 shows how the response of FIG. 29 varies when the dispersion compensation is carried out fully at the receiver.

With PSK modulation, the power envelope of the interfering channel waveform is rather more sensitive to dispersion than for NRZ ASK modulation. However, the method of analysis described above can be applied equally to ASK modulated in-service data or other modulation schemes.

The results above are for noise-free simulations. More typically, operation at optical signal to noise ratios in the range 10-30 dB is expected. Strong FEC enables operation at even lower signal to noise ratios when non-linear distortion is low.

When there is significant noise present, the 6-peak pattern is still evident, but it is more difficult to resolve the intra-span variations.

With an increased length sequence of bits, the features of the phase crosstalk waveform are still evident even for poorer signal to noise ratios, for example down to 20 dB.

The invention enables various different measurements to be taken to enable per-span parameters to be derived. It will be apparent from the description above that some of these measurements are suitable at installation, and others can be made in-service. In the case of in-service measurements, some of these may require use of wavelengths which do not carry traffic and others may be possible using wavelengths carrying live traffic.

The use of low pass filtering has been mentioned in some examples above, particularly for removing a symbol rate component. It will be apparent to those skilled in the art that notch reject filters can be used, or else a waveform can be resampled so that data is only collected mid-way between the symbol rate clock transitions, so that these transitions are again effectively filtered out.

The invention has been described above as a method and system for obtaining per-span characteristics. This information can be used in conventional manner in order to control the line amplifier settings in order to maximise signal to noise ratio for communications links.

The analysis operations described above will be controlled by software, and the invention also relates to the software for performing the analysis methods described above.

The invention claimed is:

1. An optical communications system, comprising:
   a transmitter;
   a receiver;
   an optical communications link between the transmitter and receiver comprising a plurality of spans; and
   at least one line amplifier between spans of the communications link,
   wherein the receiver comprises:
       optical to electrical conversion circuitry for converting a received optical signal to an electrical signal;
       analogue to digital conversion circuitry; and
       digital signal processing means for analysing the electrical signal, wherein the digital signal processing means derives information concerning characteristics of individual spans from the electrical digital signal,
   wherein the means for analysing the electrical digital signal analyses a cross phase modulation effect in response to first and second test signals transmitted over different channels.

2. A system as claimed in claim 1, wherein the means for analysing the electrical digital signal analyses a cross phase modulation effect in-service.

3. A system as claimed in claim 2, wherein the means for analysing the digital signal comprises:
   means for correlating a cross talk signal based on a received signal with an interfering signal to derive a correlation signal.

4. A system as claimed in claim 3, wherein the means for analysing the digital signal comprises:
   means for averaging the received signal or estimating the average received signal and deriving a complex conjugate thereof.

5. A system as claimed in claim 4, wherein the means for analysing the digital signal comprises:
   means for multiplying an XPM component of the received signal with the complex conjugate of the averaged signal in order to derive the cross talk signal.

6. A system as claimed in claim 3, wherein the interfering signal comprises a data signal transmitted over a different channel to the analysed signal.

7. A system as claimed in claim 3, wherein the means for analysing the digital signal comprises:
   means for filtering the correlation signal to remove a symbol rate component.

8. A system as claimed in claim 1, wherein the transmitter comprises means for adjusting the relative polarization states of first and second channels which interfere to produce the cross phase modulation.

9. A system as claimed in claim 8, wherein the digital signal processing means includes means for analysing electrical digital signals for different relative polarization states of the first and second channels.

10. A receiver for use in an optical communications system for receiving an optical signal from an optical link comprising a plurality of spans, the receiver comprising:
    optical to electrical conversion circuitry for converting a received optical signal to an electrical signal;
    analogue to digital conversion circuitry; and
    digital signal processing means for analysing the electrical signal, wherein the digital signal processing means derives information concerning characteristics of individual spans from the electrical digital signal, further comprising:
    transmitting first and second test signals over different channels, and
    wherein analysing the electrical digital signal comprises analysing a cross phase modulation effect between the first and second test signals.

11. A method as claimed in claim 10, wherein analysing the electrical digital signal comprises analysing a cross phase modulation effect in-service.

12. A method as claimed in claim 11, further comprising:
    correlating a cross talk signal based on the received signal with an interfering signal to derive a correlation signal.

13. A method as claimed in claim 12, wherein the interfering signal comprises a data signal transmitted over a different channel to the analysed signal.

14. A method as claimed in claim 12, wherein analysing the digital signal comprises filtering the correlation signal to remove a symbol rate component.

15. A method as claimed in claim 14, wherein analysing the digital signal comprises averaging the received signal and deriving a complex conjugate of the averaged signal.

16. A method as claimed in claim 15, wherein analysing the digital signal comprises multiplying an XPM component of the received signal with the complex conjugate of the averaged signal in order to derive the cross talk signal.

17. A method as claimed in claim 10, further comprising adjusting the relative polarization states of first and second channels which interfere to produce the cross phase modulation.

18. A method as claimed in claim 17, further comprising analysing electrical digital signals for different relative polarization states of the first and second channels.

19. A method as claimed in claim 18 wherein the rate of change with propagation distance of relative polarisation orientation between co-propagating signals is derived from the polarisation dependence of the magnitude of the XPM crosstalk induced at different locations in the fibre, thereby to determine the differential group delay or polarisation mode dispersion between said locations.

20. A method as claimed in claim 19 wherein the variation in signal power with polarisation orientation is derived, thereby to determine the polarisation-dependent loss between different locations in the fibre.

* * * * *